United States Patent
Ooishi

Patent Number: 6,014,410
Date of Patent: Jan. 11, 2000

[54] TRANSMISSION-RECEPTION SYSTEM WHICH TRANSMITS AND RECEIVES DATA VIA SIGNAL TRANSMISSION LINE

[75] Inventor: Tsukasa Ooishi, Hyogo, Japan

[73] Assignee: Mitsubishi Denki Kabushiki Kaisha, Tokyo, Japan

[21] Appl. No.: 08/882,342

[22] Filed: Jun. 25, 1997

[30] Foreign Application Priority Data

Feb. 3, 1997 [JP] Japan ................................. 9-020651

[51] Int. Cl.[7] ................................................. H04B 3/00
[52] U.S. Cl. ........................ 375/257; 375/220; 375/259
[58] Field of Search .......................... 375/257, 220, 375/259, 219; 327/108, 427, 434, 436, 437; 326/86, 83, 30; 333/20, 246

[56] References Cited

U.S. PATENT DOCUMENTS

| | | | |
|---|---|---|---|
| 3,671,671 | 6/1972 | Watanabe | 375/257 |
| 3,718,762 | 2/1973 | Nezu et el. | 375/257 |
| 4,086,534 | 4/1978 | Olson | 375/219 |
| 4,280,221 | 7/1981 | Chun et al. | 375/288 |
| 4,394,590 | 7/1983 | Honda | 327/436 |
| 4,620,310 | 10/1986 | Lvovsky et al. | 375/288 |
| 4,723,112 | 2/1988 | Diller et al. | |
| 4,736,385 | 4/1988 | Pratt et al. | 375/219 |
| 4,962,343 | 10/1990 | Nakagawa et al. | 327/383 |
| 5,719,856 | 2/1998 | May | 370/282 |
| 5,740,199 | 4/1998 | Sibigtroth | 375/219 |

FOREIGN PATENT DOCUMENTS

| | | |
|---|---|---|
| 63-78612 | 4/1988 | Japan. |
| 63-102348 | 5/1988 | Japan. |

OTHER PUBLICATIONS

"WP 2.5: A CMOS Gate Array with 600Mb/s . . . ", T. Takahashi et al., 1995 IEEE International Solid–State Circuits Conference, pp. 40–41.

"WP 2.4: A 900Mb/s Bidirectional Signaling Scheme", R. Mooney et al., 1995 IEEE International Solid–State Circuits Conference, pp. 38–39.

Primary Examiner—Stephen Chin
Assistant Examiner—Lenny Jiang
Attorney, Agent, or Firm—McDermott, Will & Emery

[57] ABSTRACT

A transmitter in a semiconductor device of transmission side charges a signal transmission line to a reference potential via a resistor, and outputs pulse signal according to data to one end of the signal transmission line via a capacitor. A receiver in a semiconductor device of reception side is activated by the pulse signal and detects the pulse signal. The consumption current can thus be reduced compared with the conventional system in which data is transmitted by swinging the potential on the entire signal transmission line.

12 Claims, 24 Drawing Sheets

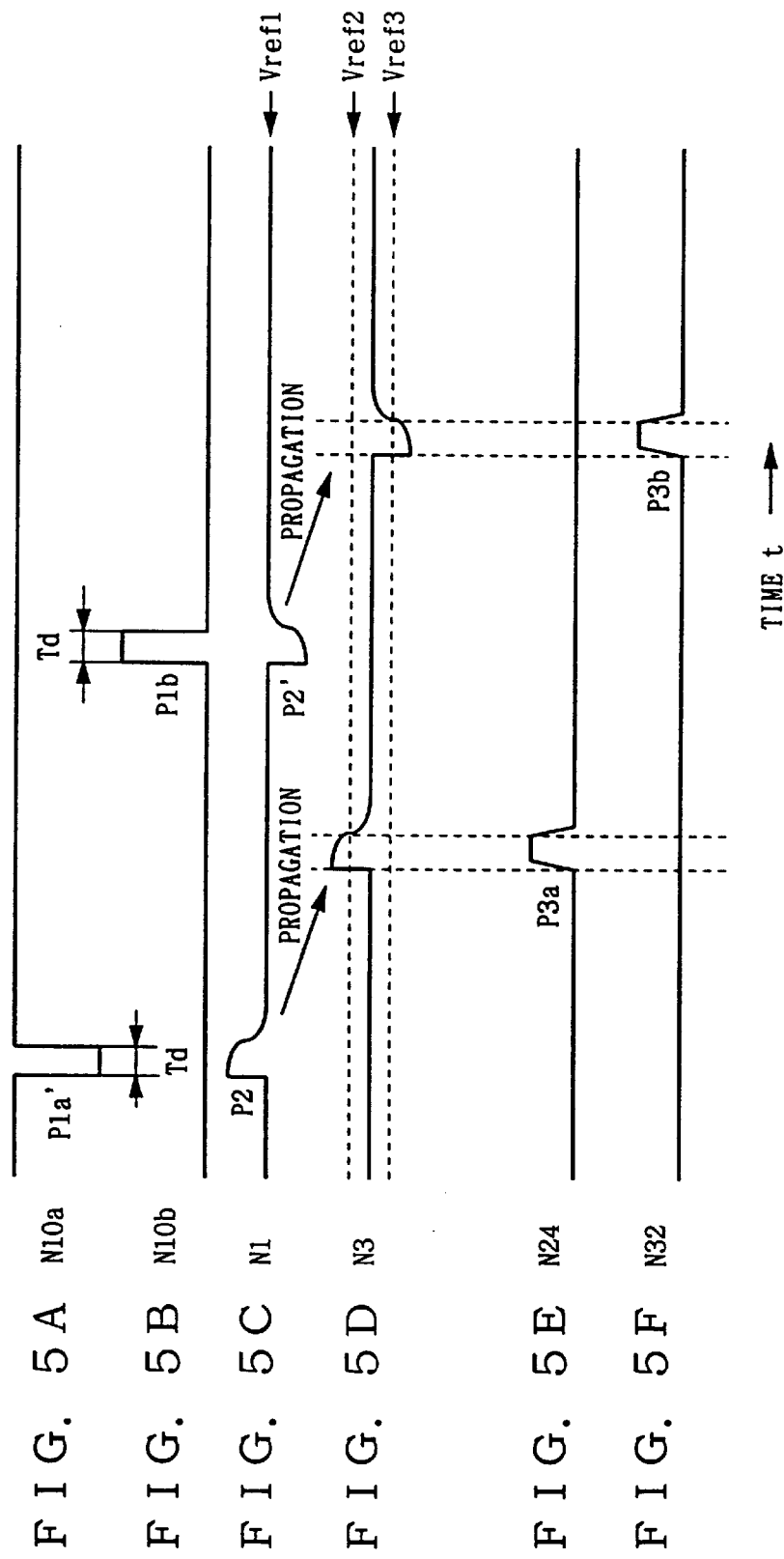

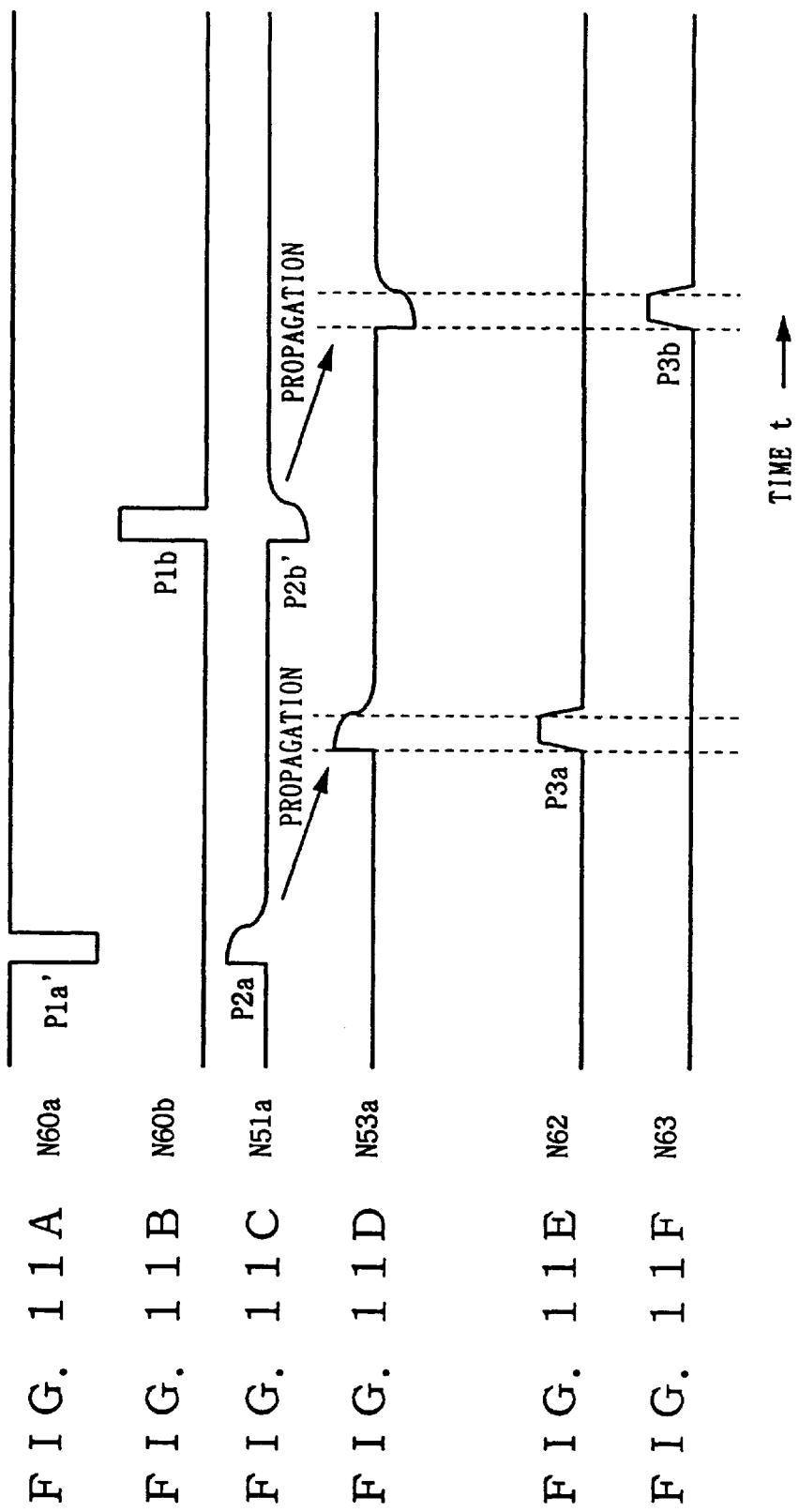

TRANSMISSION-RECEPTION SYSTEM WHICH TRANSMITS AND RECEIVES DATA VIA SIGNAL TRANSMISSION LINE

BACKGROUND OF THE INVENTION

1. Field of the Invention

The present invention relates to a transmission-reception system, and more particularly relates to a transmission-reception system which transmits and receives data via a signal transmission line.

2. Description of the Background Art

FIGS. 24A and 24B are circuit block diagrams illustrating a conventional transmission-reception system.

In the conventional transmission-reception system shown in FIGS. 24A and 24B, a transmitter 311 in a semiconductor device 301 and a receiver 313 in a semiconductor device 303 are connected by a signal transmission line 302. Signal transmission line 302 has a parasitic capacitance equal to the total capacitance of a plurality of capacitors 312.

Referring to FIG. 25, transmitter 311 and receiver 313 are each constituted by a CMOS inverter. More specifically, transmitter 311 includes a P channel MOS transistor 321 and an N channel MOS transistor 322 connected in series between a line receiving supply potential Vcc and a line receiving ground potential GND. The gates of MOS transistors 321 and 322 receive a signal $\phi 1$ generated in an internal circuit of semiconductor device 301, and the drains of MOS transistors 321 and 322 are connected to one end of signal transmission line 302. Signal $\phi 1$ attains to "L" level and "H" level respectively according to data, for example, "1" and "0".

Receiver 313 includes a P channel MOS transistor 323 and an N channel MOS transistor 324 connected in series between a line receiving supply potential Vcc and a line receiving ground potential GND. The gates of MOS transistors 323 and 324 are connected to the other end of signal transmission line 302, and a signal $\phi 3$ is output from the drains of MOS transistors 323 and 324 to an internal circuit of semiconductor device 303.

An operation of the transmission-reception system is next described. When signal $\phi 1$ is L level, P channel MOS transistor 321 and N channel MOS transistor 322 in transmitter 311 are respectively turned on and turned off to allow signal transmission line 302 to be charged to H level. Accordingly, in receiver 313, P channel MOS transistor 323 is turned off and N channel MOS transistor 324 is turned on, so that signal $\phi 3$ attains to L level.

When signal $\phi 1$ is H level, P channel MOS transistor 321 and N channel MOS transistor 322 in transmitter 311 are respectively turned off and turned on, so that signal transmission line 302 is discharged to L level. Accordingly, in receptor 313, P channel MOS transistor 323 and N channel MOS transistor 324 are respectively turned on and turned off, so that signal $\phi 3$ attains to H level. The internal circuit of semiconductor device 303 reproduces data based on signal $\phi 3$.

FIG. 26 is a circuit block diagram illustrating another conventional transmission-reception system provided for comparison with FIG. 25.

With reference to FIG. 26, an inverter including a resistor 341 and an N channel MOS transistor 342 constitutes a transmitter 331 in the transmission-reception system. Resistance element 341 is connected between a line receiving reference potential Vrefl1 and one end of a signal transmission line 332. N channel MOS transistor 342 is connected between one end of signal transmission line 332 and a line receiving ground potential GND. The gate of N channel MOS transistor 342 receives signal $\phi 1$ generated in an internal circuit of a semiconductor device of transmission side. Reference potential Vrefl1 has a value between those of supply potential Vcc and ground potential GND.

A receiver 333 is constituted by a differential amplifier including P channel MOS transistors 343 and 344 and N channel MOS transistors 345–347. MOS transistors 343 and 345 and MOS transistors 344 and 346 are respectively connected in series between a line receiving supply potential Vcc and a node N347, and MOS transistor 347 is connected between node N347 and a line receiving ground potential GND. The gates of P channel MOS transistors 343 and 344 are both connected to the drain of P channel MOS transistor 343, and thus P channel MOS transistors 343 and 344 constitute a current mirror circuit.

The gate of N channel MOS transistor 345 is connected to the other end of signal transmission line 332, and the gate of N channel MOS transistor 346 receives reference potential Vref12. Reference potential Vref12 has a value between those of reference potential Vref11 and ground potential GND. Signal $\phi 3$ is output from the drain of N channel MOS transistor 346, i.e. node N346, to an internal circuit of a semiconductor device of the reception side. The gate of N channel MOS transistor 347 receives supply potential Vcc, and N channel MOS transistor 347 supplies a constant current.

When signal $\phi 1$ is L level, N channel MOS transistor 342 is turned off and signal transmission line 332 is charged to H level. Accordingly, the current flowing through MOS transistors 343–345 becomes larger than the current flowing through MOS transistor 346, so that node N346 is charged to H level and signal $\phi 3$ attains to H level.

When signal $\phi 1$ is H level, N channel MOS transistor 342 is turned on and signal transmission line 332 is discharged to L level. Accordingly, the current flowing through MOS transistors 343–345 becomes lower than the current flowing through MOS transistor 346, so that node N346 is discharged to L level and signal $\phi 3$ attains to L level. The semiconductor device of the reception side reproduces data based on signal $\phi 3$.

According to the transmission-reception system shown in FIGS. 24 and 25, the potential on signal transmission line 302 should be fully swung between ground potential GND and supply potential Vcc. As a result, a large amount of consumption current I is necessary for charging and discharging of signal transmission line 302, as expressed by the equation I=C·Vcc·f (C is parasitic capacitance of signal transmission line 302, and f is transmission frequency).

According to the transmission-reception system shown in FIG. 26, it is enough to swing the potential on signal transmission line 332 near reference potential Vref12. As a result, consumption current I necessary for charging and discharging of signal transmission line 332 can be expressed by the equation I=C·Vdata·f (Vdata is voltage amplitude of signal transmission line 332). Accordingly, consumption current I can be reduced by decreasing the voltage amplitude Vdata.

In the transmission-reception system, the current continuously flows through N channel MOS transistor 342 in transmitter 331 during a period in which signal $\phi 1$ is H level. During a period in which the potential on signal transmission line 332 is higher than reference potential Vref12, the current is continuously passing through from the line receiving supply potential Vcc to the line receiving ground potential GND via receiver 333. Therefore, the current consumed by the entire system I is still large even in the transmission-reception system shown in FIG. 26.

SUMMARY OF THE INVENTION

An object of the invention is to provide a transmission-reception system consuming relatively small amount of current.

A transmission-reception system according to one aspect of the invention is briefly described as follows. A charging circuit charges a signal transmission line to a first potential, a transmitter outputs a pulse signal according to data to one end of the signal transmission line via a capacitor, and a receiver receives the pulse signal at the other end of the signal transmission line. Data is thus transmitted by propagating the pulse signal through the signal transmission line, so that the consumption current can be reduced compared with the conventional system in which the potential on the entire signal transmission line is swung.

Preferably, the charging circuit includes a first resistor connected between a line receiving a first potential and the signal transmission line. Accordingly, the charging circuit can be constituted easily.

Preferably, the transmitter includes the capacitor, a second resistor connected between the line receiving the first potential and one electrode of the capacitor, and a connection circuit connected between a line receiving a second potential and one electrode of the capacitor and rendered conductive momentarily in a pulsing manner according to data. When the connection circuit is rendered conductive in the pulsing manner, the second potential is transmitted to one end of the signal transmission line via the capacitor and a pulse signal is thus generated.

Preferably, the transmitter includes the capacitor, a first connection circuit connected between the line receiving the second potential and one electrode of the capacitor and rendered conductive in a pulsing manner according to data, and a second connection circuit connected between the line receiving the first potential and one electrode of the capacitor and rendered conductive when the first connection circuit is rendered non-conductive. In this case, the potential on one electrode of the capacitor can be returned to the first potential immediately after the output of the pulse signal, so that a pulse signal of higher frequency can be output.

Preferably, the receiver includes a comparison circuit activated by a pulse signal for comparing the potential on the other end of the signal transmission line with a third potential and detecting the pulse signal based on the result of the comparison. Since the comparison circuit is activated by the pulse signal, the consumption current can be further reduced compared with the conventional system in which the comparison circuit is constantly activated.

Preferably, the receiver includes a constant current source activated by a pulse signal, a third resistor through which the current output from the constant current source flows, and a comparison circuit for comparing the potentials on both ends of the third resistor and detecting the pulse signal. In this case, the receiver consuming less current can be constituted easily.

A transmission-reception system according to another aspect of the invention is configured such that the transmission-reception system according to the first aspect has a complementary structure. As a result, the consumption current can be reduced. Further, precise data transmission is possible without the influence of the noise.

Preferably, a receiver includes a comparison circuit activated by at least one of first and second pulse signals supplied from a transmitter, for comparing the potentials on the other ends of first and second signal transmission lines and detecting the pulse signal. Since the comparison circuit is activated by at least one of the first and second pulse signals, the consumption current can be further reduced compared with the conventional system in which the comparison circuit is constantly activated.

A transmission-reception system according to further aspect of the invention is briefly described as follows. First and second charging circuits respectively charge first and second signal transmission lines, a first transmitter outputs a first pulse signal according to data to the first signal transmission line, a second transmitter outputs a second pulse signal to the second signal transmission line for notifying a receiver of the output of the first pulse signal, and the receiver is activated by the second pulse signal to receive the first pulse signal. In this case, the consumption current can be reduced. In addition, data can be transmitted precisely since activation of the receiver and transmission of data are carried out utilizing separate pulse signals.

Preferably, the receiver includes an amplify circuit activated by the second pulse signal for amplifying the first pulse signal, and a third charging circuit activated by the second pulse signal and responsive to an output from the amplify circuit for returning the potential on the first signal transmission line to the first potential. Accordingly, the potential on the first signal transmission line can be returned to the first potential immediately after reception of the first pulse signal.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5A–5F are timing charts showing an operation of the transmission-reception system in FIG. 1.

FIGS. 11A–11F are timing charts showing an operation of the transmission-reception system in FIG. 8.

DESCRIPTION OF THE PREFERRED EMBODIMENTS

First Embodiment

Figure 1:
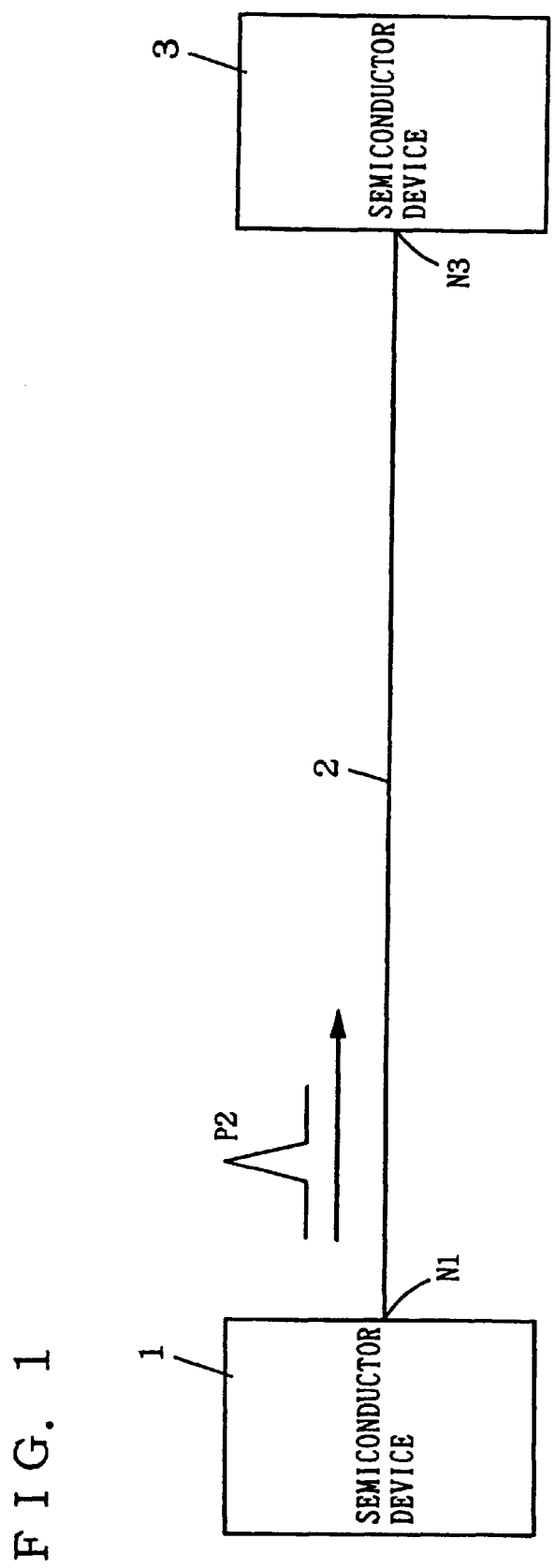
FIG. 1 is a circuit block diagram illustrating a structure of a transmission-reception system according to the first embodiment of the invention.

FIG. 1 is a circuit block diagram illustrating a structure of a transmission-reception system according to the first embodiment of the invention.

With reference to FIG. 1, in the transmission-reception system, an output node N1 of a semiconductor device 1 of transmission side and an input node N3 of a semiconductor device 3 of reception side are connected by a signal transmission line 2. Transmission of data from semiconductor device 1 to semiconductor device 3 is carried out by using a positive pulse signal P2 and a negative pulse signal P2' which propagate through signal transmission line 2, instead of swinging the potential on the entire signal transmission line 2 as in the conventional manner.

The propagation delay time T required for pulse signals P2 and P2' to propagate from semiconductor device 1 to semiconductor device 3 is expressed by $T=Z \cdot C$, where Z is the characteristic impedance of signal transmission line 2 and C is the parasitic capacitance of signal transmission line 2. Generally the characteristic impedance Z is expressed by the equation $Z=R \cdot L/2C$. The inductance L of signal transmission line 2 in the semiconductor circuit is small enough to allow the characteristic impedance Z to have a small value as expressed by the equation $Z=R \cdot C/2$. As a result, the propagation delay time T is also reduced to be approximately 1–3 ns. Accordingly, data can be transmitted by sending pulse signals P2 and P2' from semiconductor device 1 to semiconductor device 3 via signal transmission line 2, and receiving and decoding pulse signals P2 and P2' at semiconductor device 3.

Figure 24A:
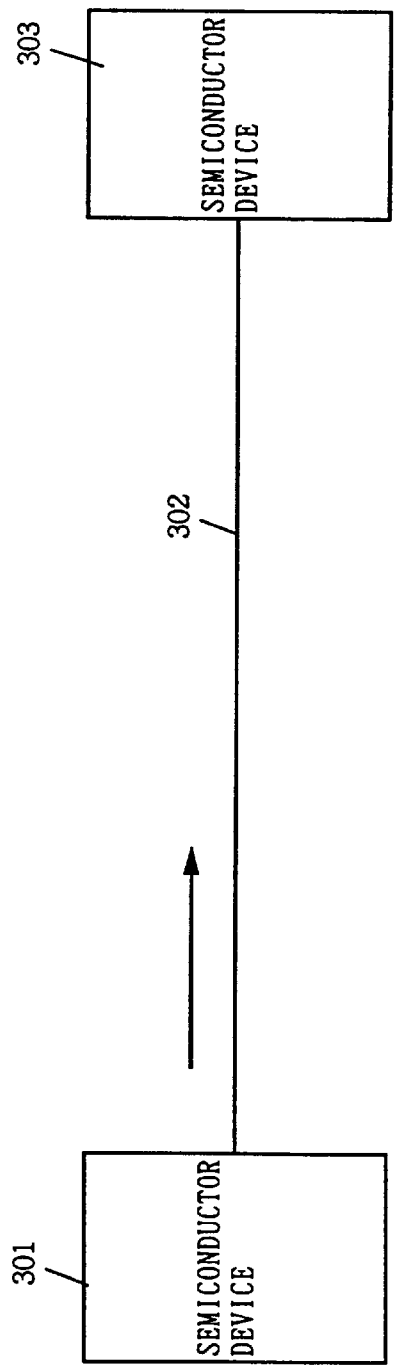
FIGS. 24A and 24B are circuit block diagrams showing a configuration of a conventional transmission-reception system.
Figure 24B:
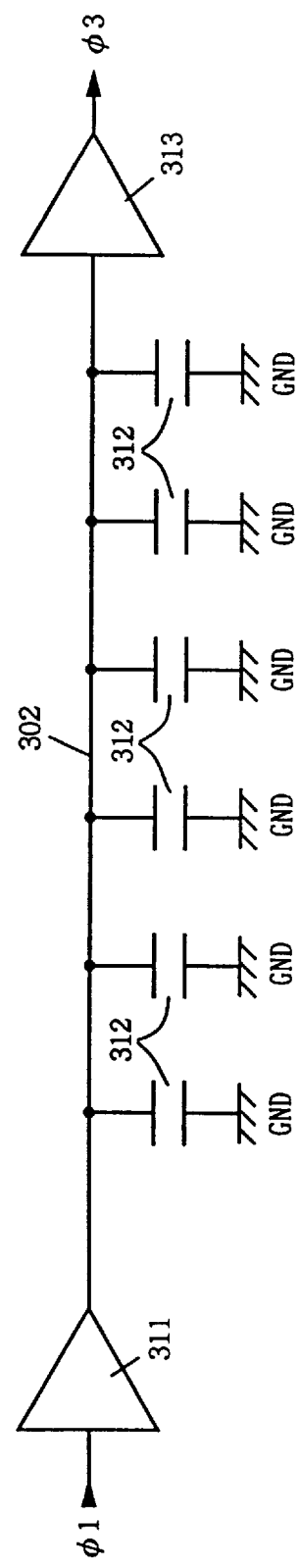
Figure 25:
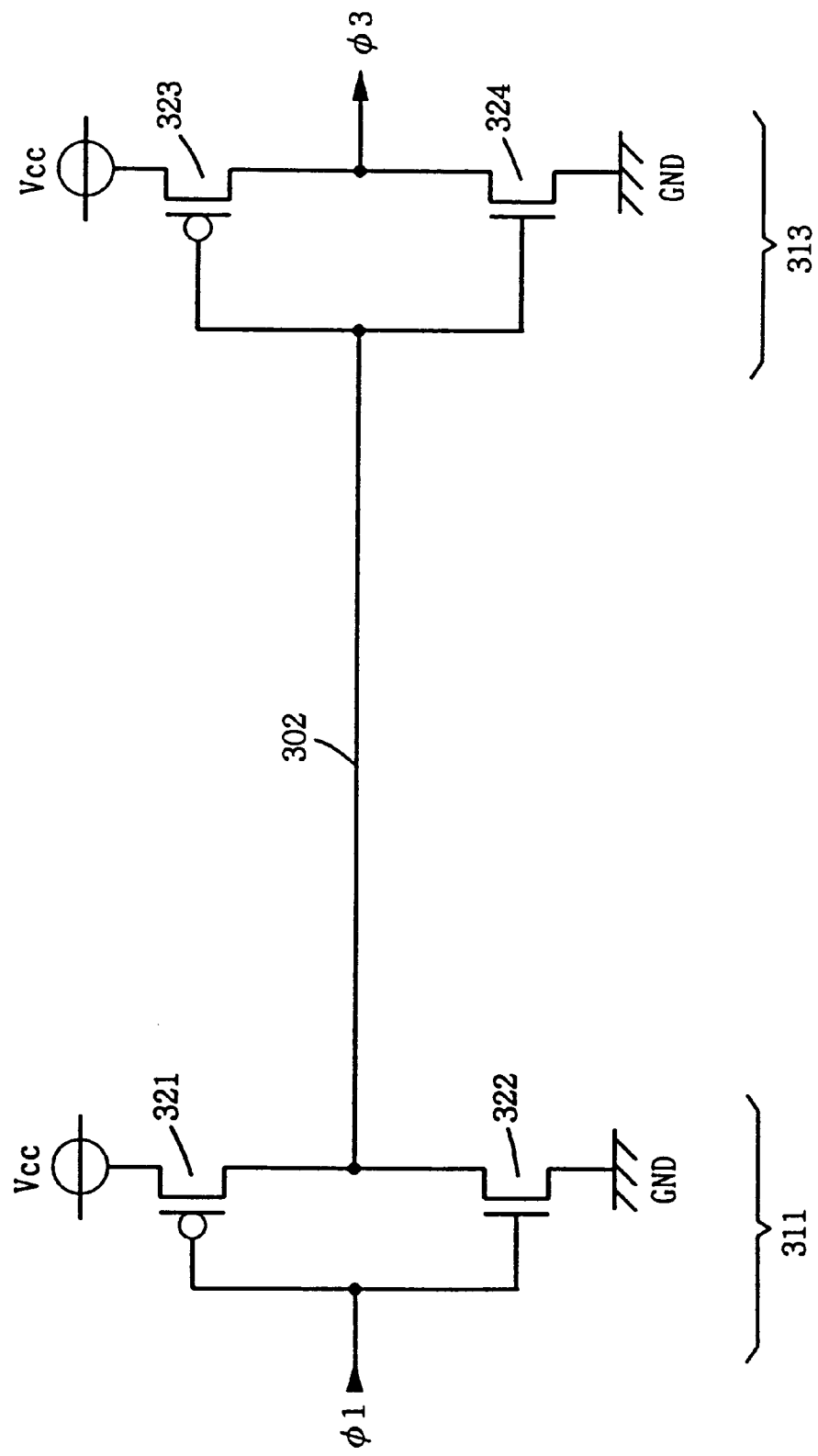
FIG. 25 is a circuit diagram showing configurations of the transmitter and receiver of the transmission-reception system illustrated in FIGS. 24A and 24B.
Figure 26:
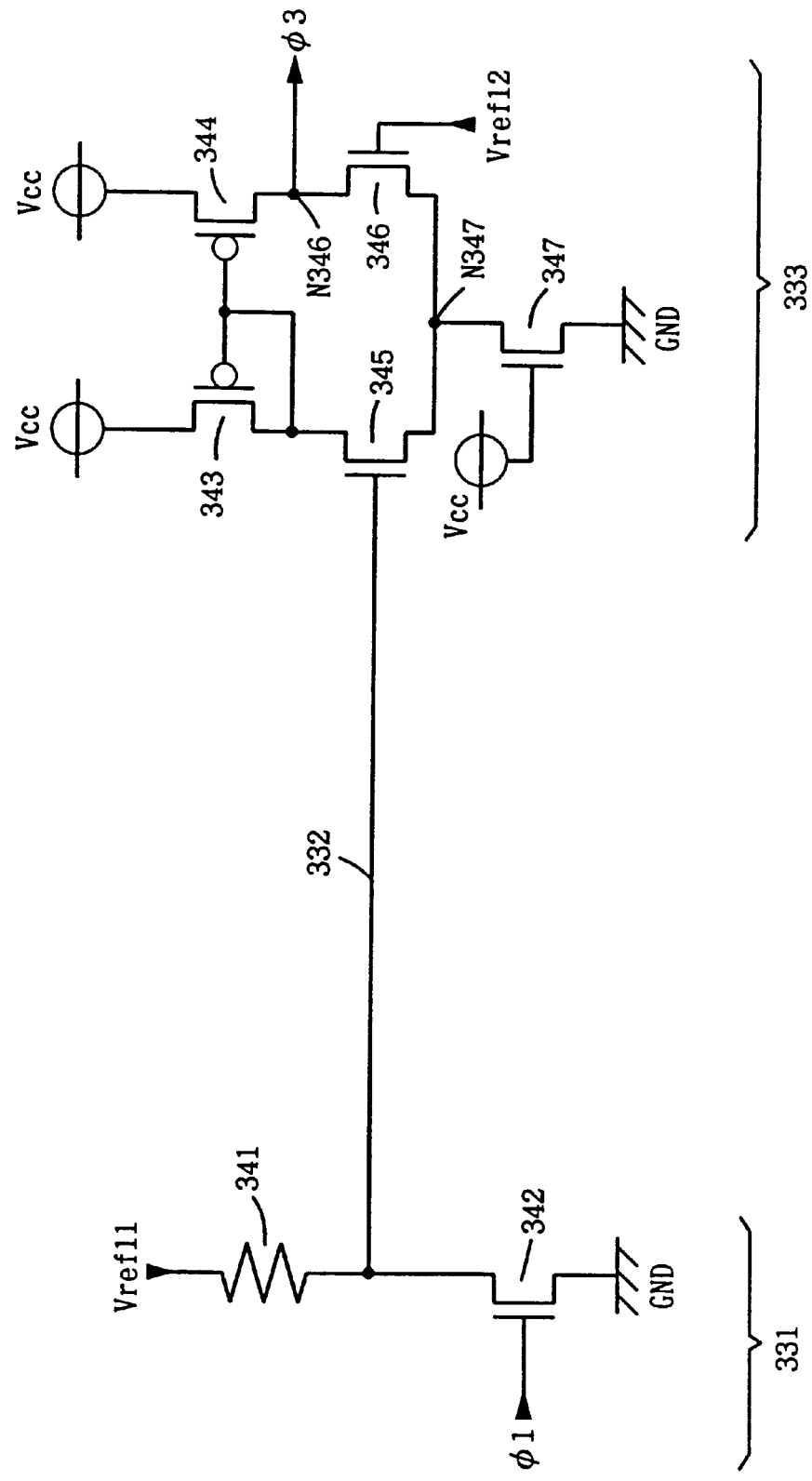
FIG. 26 is a circuit diagram showing configurations of a transmitter and a receiver of another conventional transmission-reception system.

Suppose that drive current of a transmitter in semiconductor device 1 is Id, its drive time is Td, and transmission cycle time of pulse signals P2 and P2' is Tc, consumption current I can be expressed by the equation $I=Id \cdot Td/Tc$. Accordingly, the consumption current I of this transmission-reception system does not depend on parasitic capacitance C of signal transmission line 2 and supply voltage Vcc. As a result, the value of the consumption current becomes extremely smaller compared with the consumption current $I=I \cdot Vcc \cdot f$ of the conventional transmission-reception system shown in FIGS. 24 and 25.

Figure 2:
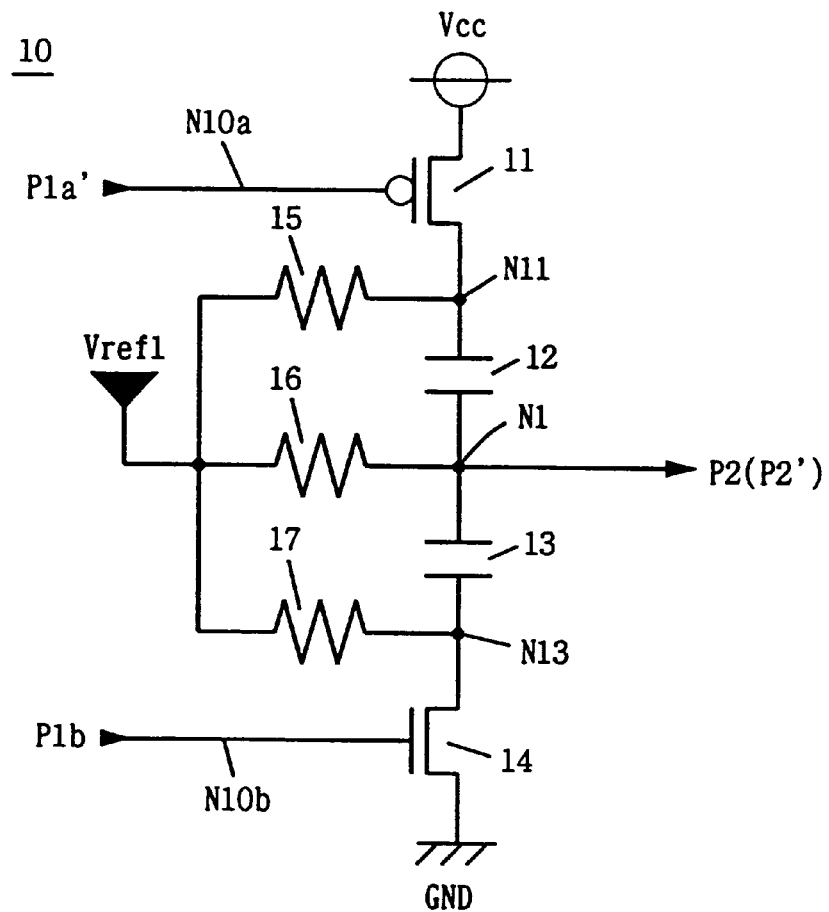
FIG. 2 is a circuit diagram showing a structure of a transmitter of the transmission-reception system in FIG. 1.

FIG. 2 is a circuit diagram illustrating a configuration of a transmitter 10 in semiconductor device 1.

With reference to FIG. 2, transmitter 10 includes a P channel MOS transistor 11, capacitors 12 and 13, an N channel MOS transistor 14, and resistors 15–17. P channel MOS transistor 11 and capacitor 12 are connected between a line receiving supply potential Vcc and an output node N1, and capacitor 13 and N channel MOS transistor 14 are connected between output node N1 and a line receiving ground potential GND. The gate of MOS transistor 11 (input node N10a) and the gate of MOS transistor 14 (input node N10b) respectively receive a negative pulse signal P1a' (a pulse signal falls from H level to L level) and a positive pulse signal (a pulse signal rises from L level to H level). Pulse signals P1a' and P1b are generated in an internal circuit of semiconductor device 1 according to transmission data. For example, negative pulse signal P1a' is produced according to data "1", and positive pulse signal P1b is produced according to data "0". One electrode of each of resistors 15–17 is connected to a line receiving reference potential Vref1. The other electrodes thereof are respectively connected to the drain of P channel MOS transistor (node N11), output node N1, and the drain of N channel MOS transistor 14 (node N13). Reference potential Vref1 is set, for example, at an intermediate potential vcc/2 between supply potential Vcc and ground potential GND.

Nodes N11, N1 and N13 are charged to reference potential Vref1 respectively through resistors 15–17. When negative pulse signal P1a' is supplied to input node N10a, P channel MOS transistor 11 is turned on. The potential on node N11 rises to supply potential Vcc to be transmitted to output node N1 via capacitor 12, and a positive pulse signal P2 (a pulse signal rises from the intermediate level to H level) is produced at output node N1.

When positive pulse signal P1b is supplied to input node N10b, N channel MOS transistor 14 is turned on, the potential on node N13 falls to ground potential GND to be transmitted to output node N1 via capacitor 13, and a negative pulse signal P2' (a pulse signal falls from the intermediate level to L level) is generated at output node N1.

Figure 3:
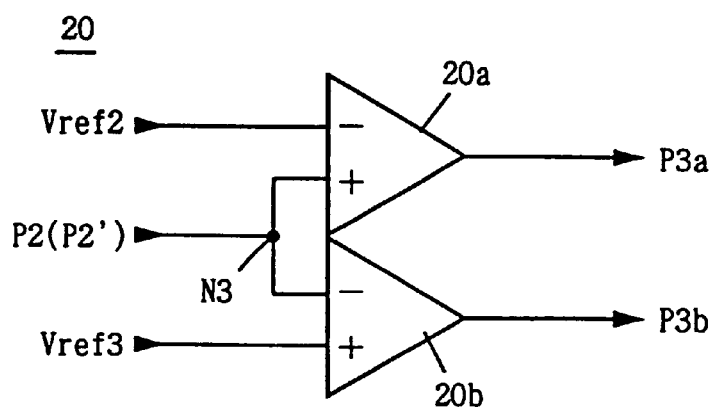
FIG. 3 is a circuit block diagram illustrating a structure of a receiver of the transmission-reception system in FIG. 1.

FIG. 3 is a circuit block diagram illustrating a configuration of a receiver 20 within semiconductor device 3 of the receiving side. Referring to FIG. 3, receiver 20 includes two differential amplifiers 20a and 20b.

Figure 4A:
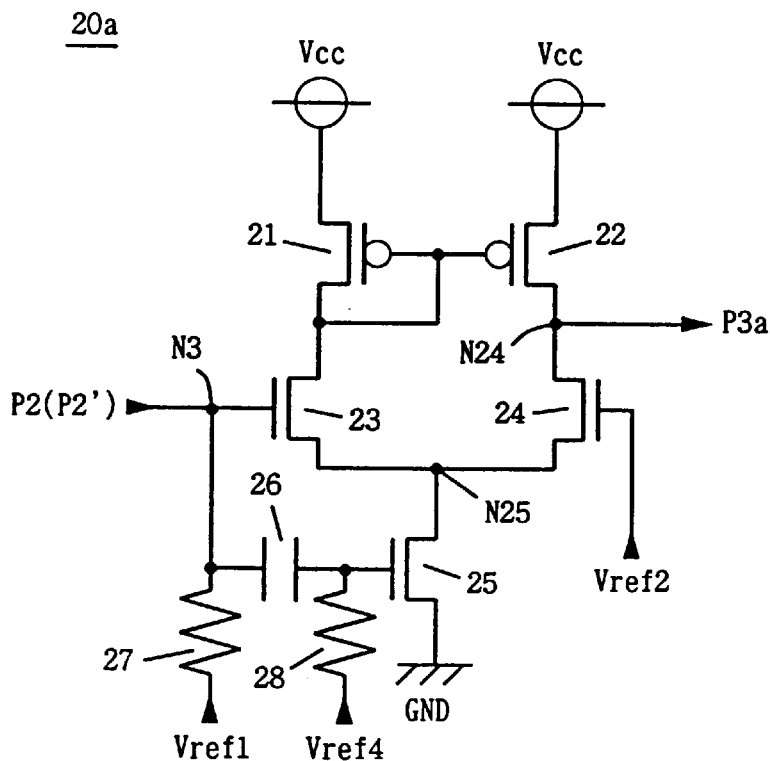
FIGS. 4A and 4B are circuit diagrams illustrating structures of differential amplifiers included in the receiver shown in FIG. 3.

As shown in FIG. 4A, differential amplifier 20a includes P channel MOS transistors 21 and 22, N channel MOS transistors 23–25, a capacitor 26, and resistors 27 and 28. MOS transistors 21 and 23 and MOS transistors 22 and 24 are respectively connected in series between a line receiving supply potential vcc and a node N25. The gates of P channel MOS transistors 21 and 22 are both connected to the drain of P channel MOS transistor 21, so that P channel MOS transistors 21 and 22 constitute a current mirror circuit. The gate of N channel MOS transistor 23 is connected to an input node N3, and the gate of N channel MOS transistor 24 receives reference potential Vref2. Reference potential Vref2 is slightly higher than reference potential Vref1. The drain of N channel MOS transistor 24 (output node N24) is connected to an internal circuit of semiconductor device 3.

N channel MOS transistor 25 is connected between node N25 and a line receiving ground potential GND, and the gate thereof receives reference potential Vref4 via resistor 28. Reference potential Vref4 is set such that N channel MOS transistor 25 is in the high resistance state. Capacitor 26 is connected between input node N3 and the gate of N channel MOS transistor 25. Resistance element 27 is connected between input node N3 and a line receiving reference potential Vref1. Capacitor 26 and resistors 27 and 28 constitute a high pass filter which passes pulse signals P2 and P2' from input node N3 to the gate of N channel MOS transistor 25.

While pulse signals P2 and P2' are not supplied, input node N3 and the gate of N channel MOS transistor 25 are respectively charged to reference potentials Vref1 and Vref4, so that the current flowing through MOS transistors 22–23 becomes smaller than the current which can be supplied by MOS transistor 24 and output node N24 is maintained at L level. Even if negative pulse signal P2' is supplied to input node N3, the same level is maintained.

When positive pulse signal P2 is supplied to input node N3, N channel MOS transistor 25 is turned on and differential amplifier 20a is activated, so that the current flowing through MOS transistors 21–23 becomes larger than the current which can be supplied by MOS transistor 24. Accordingly, output node N24 rises to H level, and a positive pulse signal P3a (a pulse signal rises from L level to H level) is provided to the internal circuit of semiconductor device 3.

Figure 4B:
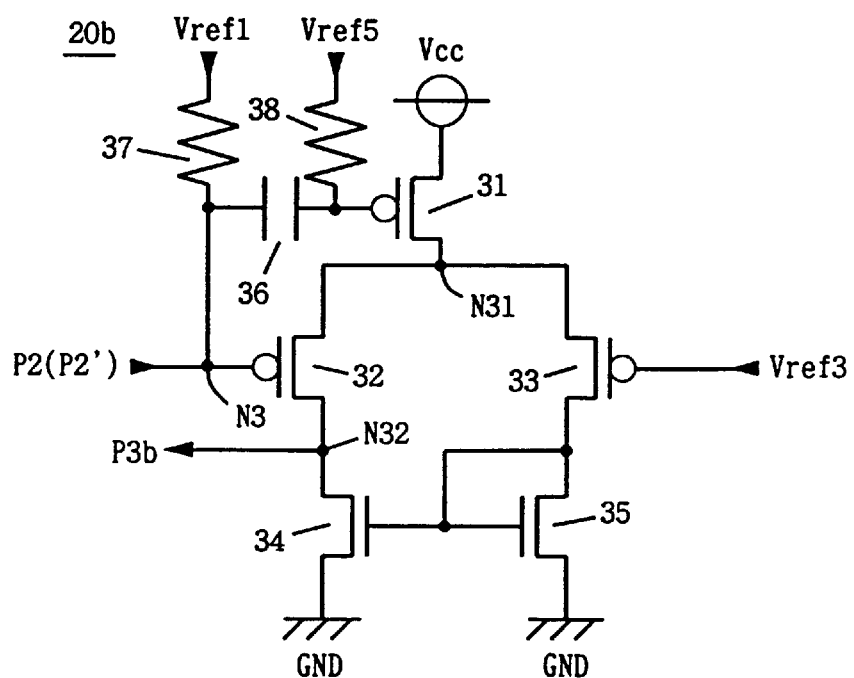

As shown in FIG. 4B, differential amplifier 20b includes P channel MOS transistors 31–33, N channel MOS transistors 34 and 35, a capacitor 36, and resistors 37 and 38. MOS transistors 34 and 32 and MOS transistors 35 and 33 are respectively connected in series between a line receiving ground potential GND and a node N31. The gates of N channel MOS transistors 34 and 35 are both connected to the drain of N channel MOS transistor 35, so that N channel MOS transistors 34 and 35 constitute a current mirror circuit. The gate of P channel MOS transistor 32 is connected to input node N3, and the gate of P channel MOS transistor 33 receives reference potential Vref3. Reference potential Vref3 is slightly higher than reference potential Vref1. The drain of P channel MOS transistor 32 (output node N32) is connected to the internal circuit of semiconductor device 3.

P channel MOS transistor 31 is connected between a line receiving supply potential Vcc and node N31, and the gate thereof receives reference potential Vref5 via resistor 38. Potential Vref5 is set such that P channel MOS transistor 31 is in the high resistance state. Capacitor 36 is connected between input node N3 and the gate of P channel MOS transistor 31. Resistance element 37 is connected between input node N3 and reference potential Vref1. Capacitor 36 and resistors 37 and 38 constitute a high pass filter for passing pulse signals P2 and P2' from input node N3 to the gate of P channel MOS transistor 31.

While pulse signals P2 and P2' are not supplied to input node N3, input node N3 and the gate of P channel MOS transistor 31 are respectively charged to reference potentials Vref1 and Vref5, so that the current flowing through MOS transistors 33–35 becomes higher than the current flowing through MOS transistor 32 and output node N32 is maintained at L level. Even if positive pulse signal P2 is supplied to input node N3, the same level is maintained.

When negative pulse signal P2' is supplied to input node N3, P channel MOS transistor 31 is turned on and differential amplifier 20b is activated. The current flowing through MOS transistor 32 becomes higher than the current flowing through MOS transistors 33–35, output node N32 rises to H level, and a positive pulse signal P3b (a pulse signal rises from L level to H level) is supplied to the internal circuit of semiconductor device 3.

FIGS. 5A–5F are timing charts showing an operation of the transmission-reception system. According to data "1", negative pulse signal P1a' is generated at the internal circuit of transmission side semiconductor device 1, and the negative pulse signal P1a' is supplied to transmitter 10 in FIG. 2. Responsive to the pulse, P channel MOS transistor 11 in transmitter 10 is turned on in a pulsing manner and positive pulse signal P2 is output to one end of signal transmission line 2.

Positive pulse signal P2 propagates through signal transmission line 2 and arrives at semiconductor device 3 of the reception side to be input to differential amplifier 20a in FIG. 4A. Responsive to the pulse, differential amplifier 20a is activated, the potential on input node N3 becomes higher than reference potential Vref2, so that positive pulse signal P3a is output. Positive pulse signal P3a is decoded to data "1" at the internal circuit of semiconductor device 3.

According to data "0", positive pulse signal P1b is produced at the internal circuit of transmission side semiconductor device 1, and the positive pulse signal P1b is supplied to transmitter 10 in FIG. 2. Responsive to the pulse, N channel MOS transistor 14 in transmitter 10 is turned on in a pulsing manner, and negative pulse signal P2' is output to one end of signal transmission line 2.

Negative pulse signal P2' propagates through signal transmission line 2 and arrives at semiconductor device 3 of the reception side to be supplied to differential amplifier 20b in FIG. 4B. Responsive to the pulse, differential amplifier 20b is activated, the potential on input node N3 becomes smaller than reference potential Vref3, and positive pulse signal P3b is output. Positive pulse signal P3b is decoded to data "0" at the internal circuit of semiconductor device 3.

According to this embodiment, data is transmitted by propagating pulse signals P2 and P2' through signal transmission line 2. As a result, the consumption current can be reduced compared with the conventional system in which the potential on the entire signal transmission line 2 is swung.

Figure 6:
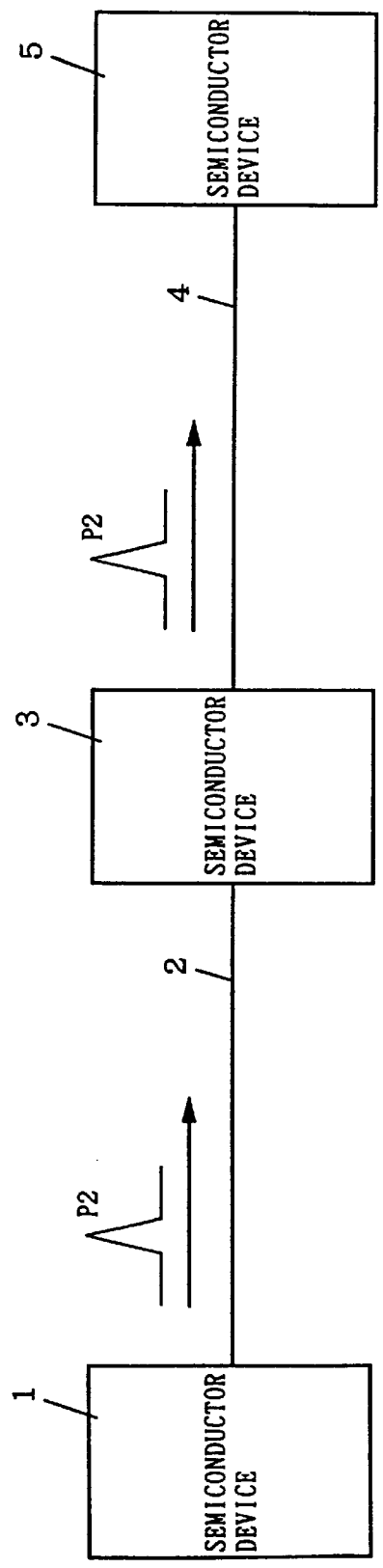
FIG. 6 is a circuit block diagram showing an improved example of the transmission-reception system shown in FIG. 1.

As shown in FIG. 6, it is obviously possible to transmit data from semiconductor device 3 to semiconductor device 5 using pulse signals P2 and P2' propagating through signal transmission line 4 by further providing a transmitter 10 within semiconductor device 3 and connecting semiconductor device 3 and another semiconductor device 5 utilizing a signal transmission line 4.

Although data "1" and "0" are transmitted using positive pulse signal P2 and negative pulse signal P2' in this embodiment, data "1" and "0" may be transmitted according to the presence or absence of pulse signal P2 (or P2') in a certain period. In this case, components related to pulse signals P1b, P2', and P3b (or P1a, P2, and P3a) are not required.

Figure 7:
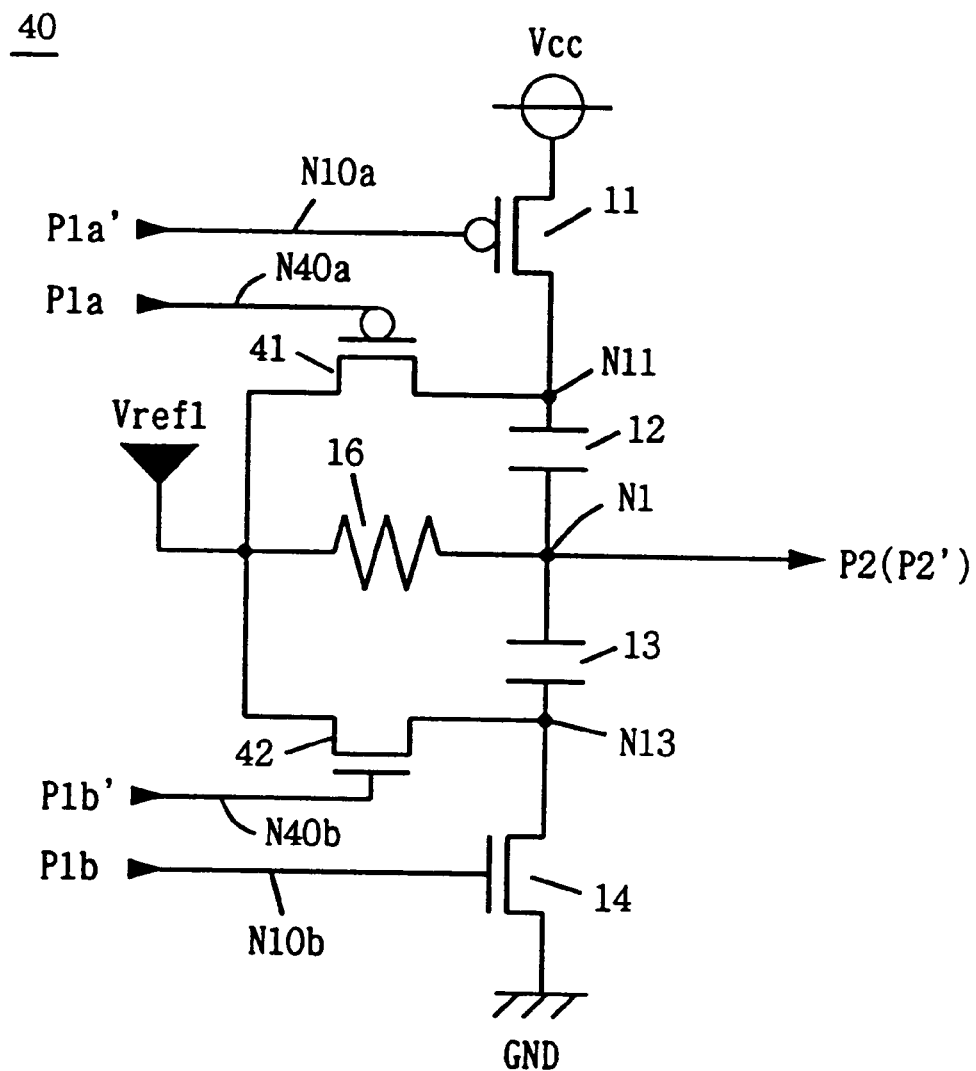
FIG. 7 is a circuit diagram illustrating an improved example of the transmitter shown in FIG. 2.

FIG. 7 is a circuit diagram showing an improved example of transmitter 10 in FIG. 2. Referring to FIG. 7, the difference between a transmitter 40 and transmitter 10 is that resistors 15 and 17 are respectively replaced with a P channel MOS transistor 41 and an N channel MOS transistor 42. The gate of P channel MOS transistor 41 (input node N40a) receives positive pulse signal P1a (a pulse signal which rises from L level to H level) applied simultaneously with negative pulse signal P1a', and the gate of N channel MOS transistor 42 (input node N40b) receives negative pulse signal P1b' (a pulse signal which falls from H level to L level) applied simultaneously with positive pulse signal P1b.

While pulse signals P1a, P1a', P1b, and P1b' are not supplied to the input node, MOS transistors 11 and 14 are turned off and MOS transistors 41 and 42 are turned on. Nodes N11, N1, and N13 are then charged to reference potential Vref1. When pulse signals P1a' and P1a are input, P channel MOS transistor 41 is turned off in a pulsing manner and P channel MOS transistor 11 is turned on in a pulsing manner, so that positive pulse signal P2 is generated. When pulse signals P1b and P1b' are supplied, N channel MOS transistor 42 is turned off in a pulsing manner and N channel MOS transistor 14 is turned on in a pulsing manner, so that negative pulse signal P2' is output.

In this improved example, the potentials on nodes N11 and N13 can be returned to the reference potential more speedily compared with transmitter 10 after the output of pulse signals P2 and P2'. Accordingly, pulse signals P2 and P2' can be output at still higher frequency.

Second Embodiment

Figure 8:
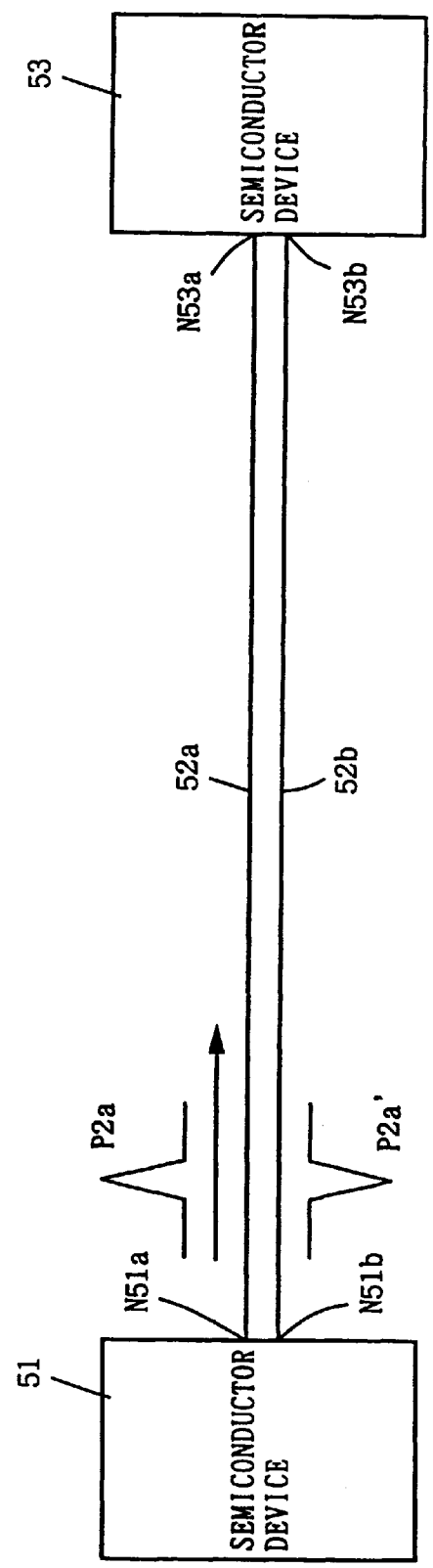
FIG. 8 is a circuit block diagram illustrating a configuration of a transmission-reception system according to the second embodiment of the invention.

FIG. 8 is a circuit block diagram illustrating a transmission-reception system according to the second embodiment of the invention.

The transmission-reception system shown in FIG. 8 is configured by modifying the transmission-reception system according to the first embodiment to have a complementary structure. Specifically, a pair of output nodes N51a and N51b at a semiconductor device 51 of the transmission side and a pair of input nodes N53a and N53b at a semiconductor device 53 of the reception side are connected by a pair of signal transmission lines 52a and 52b. Data is transmitted from semiconductor devices 51 to 53 by pairs of complementary pulse signals P2a and P2a' as well as P2b' and P2b transmitted through signal transmission lines 52a and 52b.

Figure 9A:
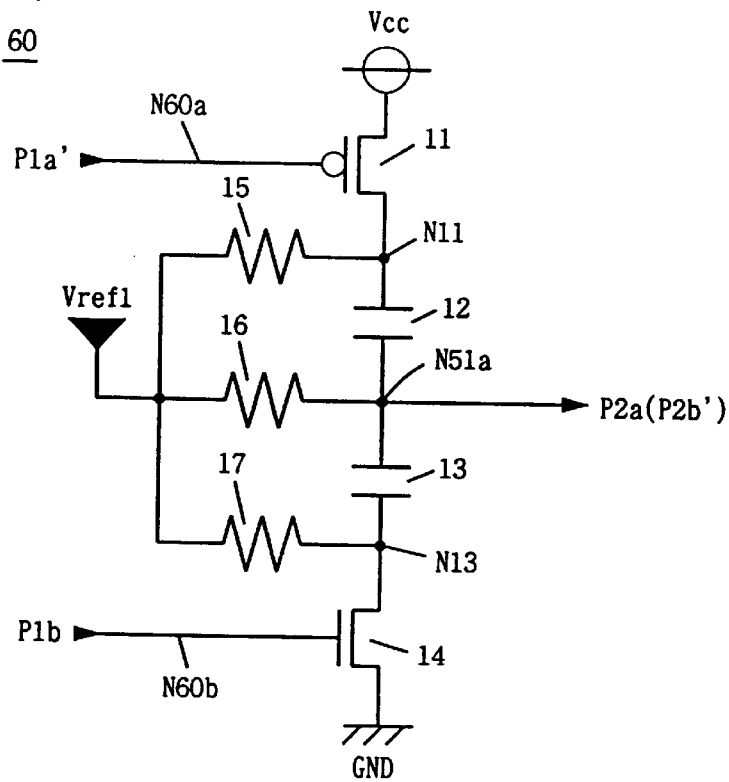
FIGS. 9A and 9B are circuit diagrams showing configurations of transmitters in the transmission) reception system in FIG. 8.
Figure 9B:
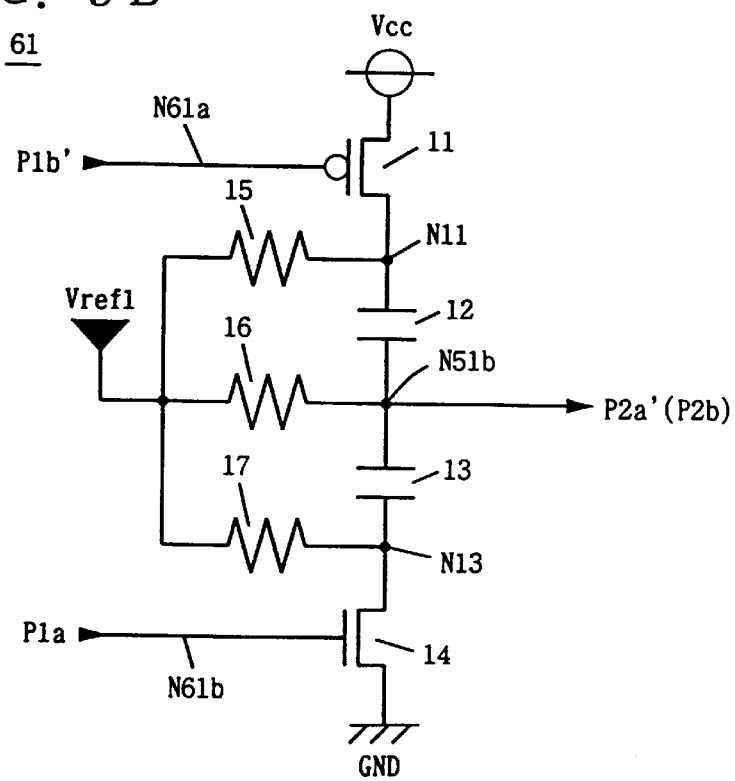

FIGS. 9A and 9B are circuit diagrams showing configurations of transmitters 60 and 61 in semiconductor device 51. Referring to FIGS. 9A and 9B, transmitters 60 and 61 are respectively provided corresponding to signal transmission lines 52a and 52b, and both have a structure identical to that of transmitter 10 in FIG. 2. The gates of MOS transistors 11 and 14 in transmitter 60 (input nodes N60a and N60b) respectively receive negative pulse signal P1a' (a pulse signal which falls from H level to L level) and positive pulse signal P1b (a pulse signal which rises from L level to H level). From output node N51a in transmitter 60, pulse signal P2a (a pulse signal which rises from the intermediate level to H level) or negative pulse signal P2b' (a pulse signal which falls from the intermediate level to L level) is output.

Negative pulse signal P1b' (a pulse signal which falls from H level to L level and is complementary to positive pulse signal P1b), and positive pulse signal P1a (a pulse signal which rises from L level to H level and is complementary to negative pulse signal P1a') are respectively supplied to the gates of MOS transistors 11 and 14 in transmitter 61. From output node N51b in transmitter 61, negative pulse signal P2a' (a pulse signal which falls from the intermediate level to L level and is complementary to positive pulse signal P2a), or positive pulse signal P2b (a pulse signal which rises from the intermediate level to H level and is complementary to negative pulse signal P2b') is output.

When pulse signals P1a' and P1a are supplied to transmitters 60 and 61 from an internal circuit of semiconductor device 51, positive pulse signal P2a and negative pulse signal P2a' are supplied respectively to output nodes N51a and N51b. When pulse signals P1b and P1b' are supplied to transmitters 60 and 61 from the internal circuit of semiconductor device 51, negative pulse signal P2b' and positive pulse signal P2b are output respectively to output nodes N51a and N51b.

Figure 10A:
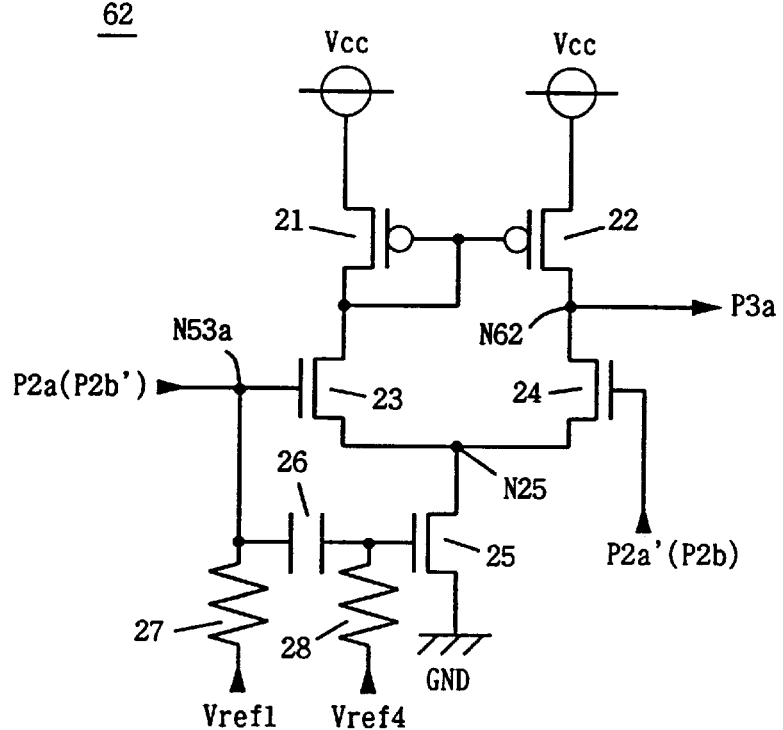
FIGS. 10A and 10B are circuit diagrams illustrating configurations of differential amplifiers included in the receiver in the transmission-reception system in FIG. 8.
Figure 10B:
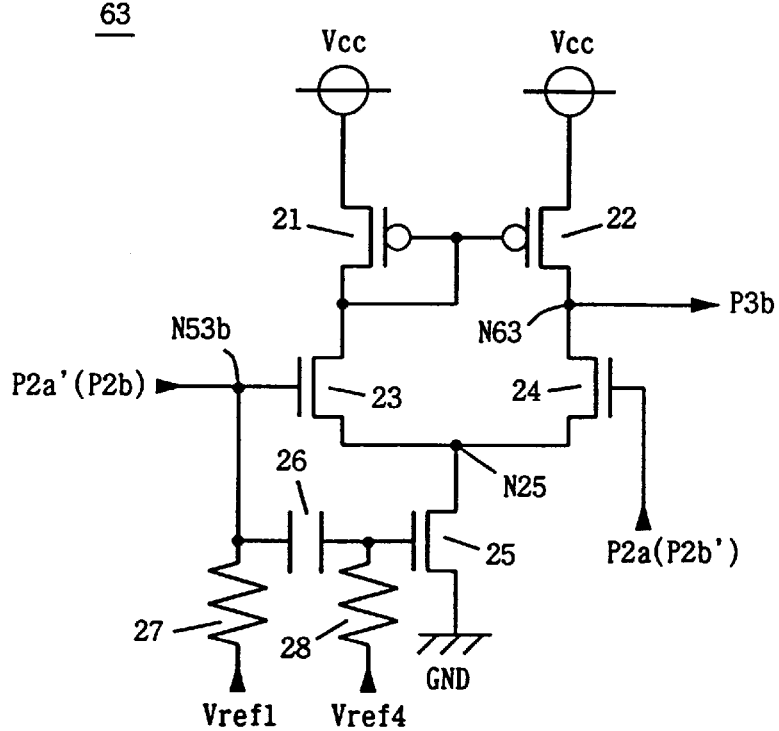

FIGS. 10A and 10B are circuit block diagrams illustrating a configuration of a receiver in semiconductor device 53 of the reception side. Referring to FIGS. 10A and 10B, the receiver includes two differential amplifiers 62 and 63. Differential amplifiers 62 and 63 are respectively provided corresponding to signal transmission lines 52a and 52b, and both have a structure identical to that of differential amplifier 20a in FIG. 4A. However, the gates of N channel MOS transistors 23 and 24 in differential amplifier 62 receive pulse signals P2a and P2a' or P2b' and P2b respectively. The gates of N channel MOS transistors 23 and 24 in differential amplifier 63 respectively receive pulse signals P2a' and P2a or P2b and P2b'. From output node N62 (the drain of N channel MOS transistor 24) in differential amplifier 62, positive pulse signal P3a is output. From utput node N63 (the drain of N channel MOS transistor 24) in differential amplifier 63, positive pulse signal P3b is output.

While pulse signals P2a and P2a' or P2b' and P2b are not supplied, output nodes N62 and N63 in differential amplifiers 62 and 63 are respectively maintained at a level intermediate between L level and H level.

When pulse signals P2a and P2a' are input, differential amplifier 62 is activated and positive pulse signal P3a is output from output node N62 to an internal circuit of semiconductor device 53. When pulse signals P2b' and P2b are input, differential amplifier 63 is activated and positive pulse signal P3b is output from output node N63 to the internal circuit of semiconductor device 53.

FIGS. 11A–11F are timing charts illustrating an operation of the transmission-reception system. According to data "1", pulse signals P1a' and P1a are generated at the internal circuit of semiconductor device 51 of the transmission side, and pulse signals P1a' and P1a are supplied to transmitters 60 and 61 in FIGS. 9A and 9B. Responsive to the pulses, MOS transistors 14 and 11 in transmitters 60 and 61 are turned on in a pulsing manner, so that pulse signals P2a and P2a' are each output to one end of each of transmission lines 52a and 52b.

Pulse signals P2a and P2a' propagate through signal transmission lines 52a and 52b and arrive at semiconductor device 53 of the reception side to be input to differential amplifiers 62 and 63 in FIGS. 10A and 10B. Responsive to the pulse signals, differential amplifier 62 is activated and pulse signal P3a is output. Pulse signal P3a is decoded to data "1" at the internal circuit of semiconductor device 53.

According to data "0", pulse signals P1b and P1b' are generated at the internal circuit of semiconductor device 51 of the transmission side, and pulse signals P1*b* and P1*b*' are supplied to transmitters 60 and 61 in FIGS. 9A and 9B. Responsive to the pulses, MOS transistors 14 and 11 in transmitters 60 and 61 are turned on in a pulsing manner, and pulse signals P2*b*' and P2*b* are each output to one end of each of signal transmission lines 52*a* and 52*b*.

Pulse signals P2*b*' and P2*b* propagate through signal transmission lines 52*a* and 52*b* and arrive at semiconductor device 53 of the reception side to be input to differential amplifiers 62 and 63 in FIGS. 10A and 10B. Responsive to the pulse signals, differential amplifier 63 is activated and pulse signal P3*b* is output. Pulse signal P3*b* is decoded to data "0" at the internal circuit of semiconductor device 53.

According to this embodiment, an effect similar to that of the first embodiment can be obtained. Further, the influence of the noise is reduced owing to the complementary structure.

Figure 12:
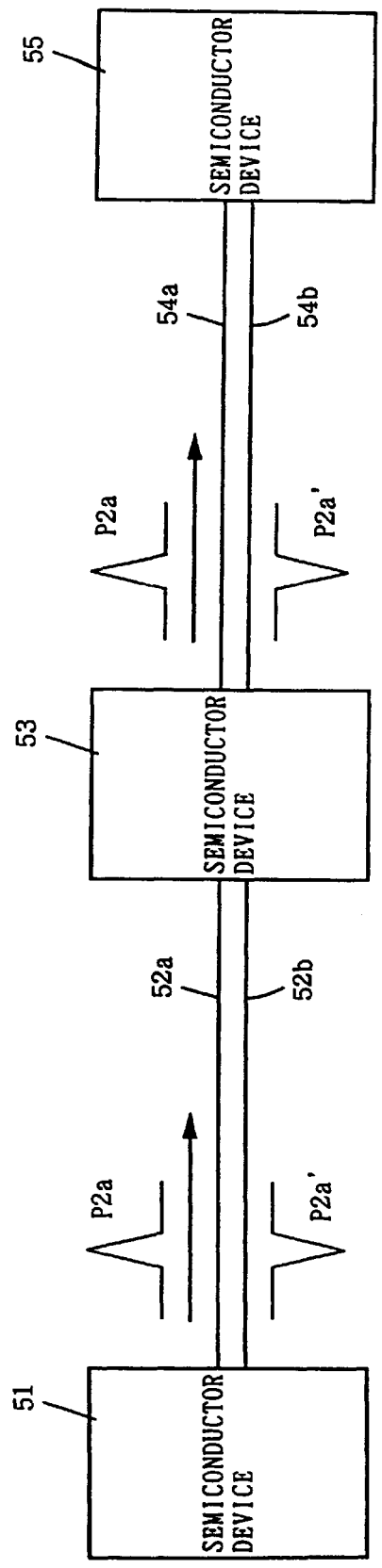
FIG. 12 is a circuit block diagram showing an improved example of the transmission-reception system in FIG. 8.

As shown in FIG. 12, it is obviously possible to transmit data from semiconductor devices 53 to 55 by a pair of pulse signals P2*a* and P2*a*' propagating through a pair of signal transmission lines 54*a* and 54*b* by providing transmitters 60 and 61 for semiconductor device 53, and connecting semiconductor device 53 and another semiconductor device 55 using the pair of signal transmission lines 54*a* and 54*b*.

Third Embodiment

Figure 13:
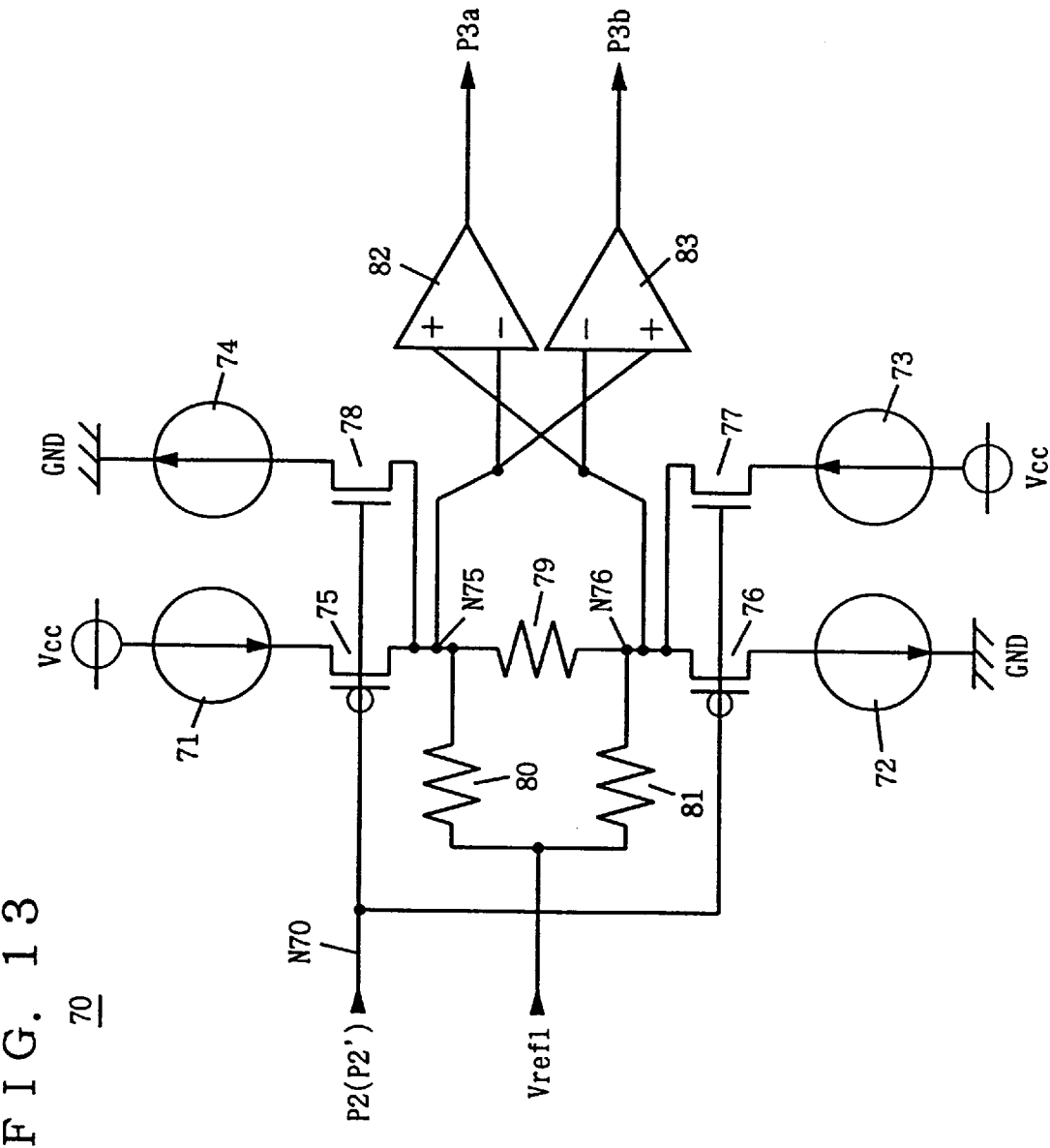
FIG. 13 is a circuit block diagram showing a configuration of a receiver in a transmission-reception system according to the third embodiment of the invention.

FIG. 13 is a circuit block diagram illustrating a configuration of a receiver 70 in a transmission-reception system according to the third embodiment of the invention. The entire configuration of the system is similar to the one according to the first embodiment.

Referring to FIG. 13, receiver 70 includes constant current sources 71–74, P channel MOS transistors 75 and 76, N channel MOS transistors 77 and 78, resistors 79–81, and differential amplifiers 82 and 83. Constant current source 71, P channel MOS transistor 75, resistor 79, P channel MOS transistor 76, and constant current source 72 are connected in series between a line receiving source potential Vcc and a line receiving ground potential GND. Constant current source 73 and N channel MOS transistor 77 are connected in series between a line receiving source potential Vcc and the source of P channel MOS transistor 76 (node N76). N channel MOS transistor 78 and constant current source 74 are connected in series between the drain of P channel MOS transistor 75 (node N75) and a line receiving ground potential GND. The gates of MOS transistors 75–78 (input node N70) receive pulse signals P2 and P2'.

Resistance elements 80 and 81 are respectively connected between a line receiving reference potential Vref1 and nodes N75 and N76. Differential amplifiers 82 and 83 respectively have structures similar to those of differential amplifiers 20*a* and 20*b* in FIG. 4. Differential amplifier 82 compares the potentials on nodes N76 and N75 and outputs H level when the potential on node N76 exceeds the potential on node N75. Differential amplifier 83 compares the potentials on nodes N75 and N76, and outputs H level when the potential on node N75 exceeds the potential on node N76.

An operation of receiver 70 is next described. While pulse signals P2 and P2' are not input to input node N70, node N70 is maintained at reference potential Vref1 (Vcc/2). Accordingly, each of MOS transistors 75–78 is in the high resistance state. In this case, a circuit constant is set such that the potentials on node N75 and node N76 are equal, and differential amplifiers 82 and 83 both output L level.

When positive pulse signal P2 is supplied to input node N70, P channel MOS transistors 75 and 76 are turned off in a pulsing manner and N channel MOS transistors 77 and 78 are turned on in a pulsing manner. As a result, the current flows from constant current sources 73 and 74 to resistor 79, and the potential on node N76 becomes higher than the potential on node N75 in a pulsing manner. Accordingly, positive pulse signal P3*a* is output from differential amplifier 82.

When negative pulse signal P2' is supplied to input node N70, P channel MOS transistors 75 and 76 are turned on in a pulsing manner and N channel MOS transistors 77 and 78 are turned off in a pulsing manner. The current flows from constant current sources 71 and 72 to resistor 79, so that the potential on node N75 exceeds the potential on node N76 in a pulsing manner. Accordingly, positive pulse signal P3*b* is output from differential amplifier 83.

According to this embodiment, an effect similar to that of the first embodiment can be obtained.

Fourth Embodiment

Figure 14:
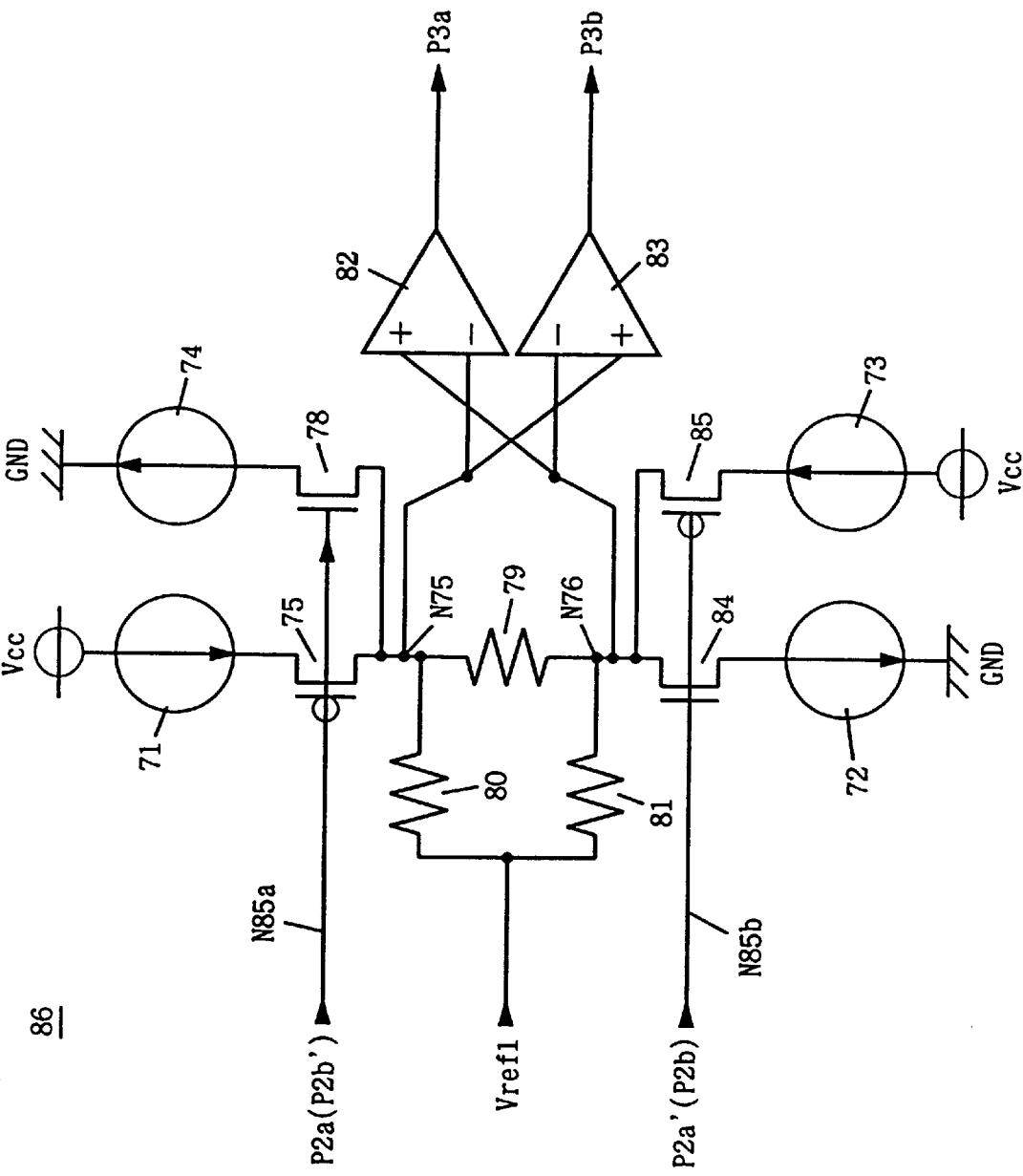
FIG. 14 is a circuit block diagram showing a configuration of a receiver in a transmission-reception system according to the fourth embodiment of the invention.

FIG. 14 is a circuit block diagram illustrating a configuration of a receiver 86 in a transmission-reception system according to the fourth embodiment. The entire configuration of the system is similar to that of the second embodiment.

Referring to FIG. 14, the difference between receiver 86 and receiver 70 in FIG. 13 is that P channel MOS transistor 76 and N channel MOS transistor 77 are respectively replaced with an N channel MOS transistor 84 and a P channel MOS transistor 85. The gates of MOS transistors 75 and 78 (input node N85*a*) receive pulse signals P2*a* and P2*b*'. The gates of MOS transistors 84 and 85 (input node N85*b*) receive pulse signals P2*a*' and P2*b*.

An operation of receiver 86 is next described. While pulse signals P2*a* and P2*a*' or P2*b*' and P2*b* are not supplied to input nodes N85*a* and N85*b*, nodes N85*a* and N85*b* are maintained at reference potential Vref1 (Vcc/2). As a result, each of MOS transistors 75, 78, 84 and 85 is in the high resistance state. A circuit constant is set such that the potentials on node N75 and node N76 are equal and differential amplifiers 82 and 83 both output L level.

When pulse signals P2*a* and P2*a*' are input to input nodes N85*a* and N85*b* MOS transistors 75 and 84 are turned off in a pulsing manner and MOS transistors 85 and 78 are turned on in a pulsing manner. The current flows from constant current sources 73 and 74 to resistor 79, so that the potential on node N76 exceeds the potential on node N75 in a pulsing manner. Accordingly, positive pulse signal P3*a* is output from differential amplifier 82.

When pulse signals P2*b*' and P2*b* are applied to input nodes N85*a* and N85*b*, MOS transistors 75 and 84 are turned on in a pulsing manner and MOS transistors 85 and 78 are turned off in a pulsing manner. The current flows from constant current sources 71 and 72 to resistor 79, so that the potential on node N75 becomes higher than the potential on node N76 in a pulsing manner. Accordingly, positive pulse signal P3*b* is output from differential amplifier 83.

Similarly, an effect of the second embodiment can be obtained in this embodiment.

Fifth Embodiment

Figure 15:
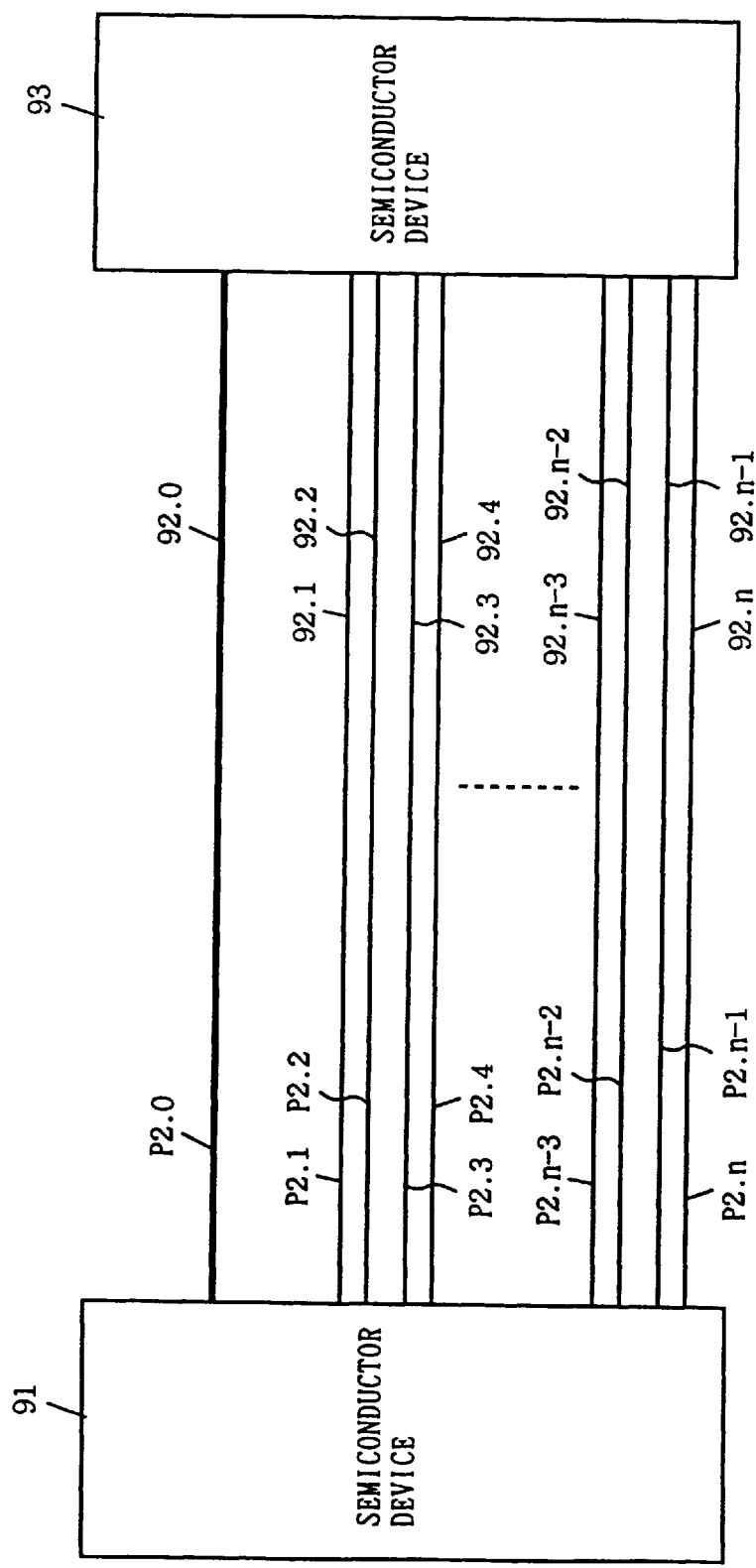
FIG. 15 is a block diagram of a partially omitted circuit showing a configuration of a transmissionreception system according to the fifth embodiment of the invention.

FIG. 15 is a circuit block diagram illustrating a configuration of a transmission and reception system according to the fifth embodiment.

Referring to FIG. 15, the transmission-reception system includes a semiconductor device 91 of the transmission side and a semiconductor device 93 of the reception side connected by a plurality of signal transmission lines 92.0–92.n. N pulse signals P2.1–P2.n are transmitted from semiconductor device 91 to semiconductor device 93 via signal transmission lines 92.1–92.n and data of n bits is thus transmitted. Simultaneously with the transmission of pulse signals 2.1–P2.n, pulse signal P2.0 is transmitted from semiconductor device 91 to semiconductor device 93 via signal transmission line 92.0, thereby notifying semiconductor device 93 of the timing of the data transmission.

Figure 16:
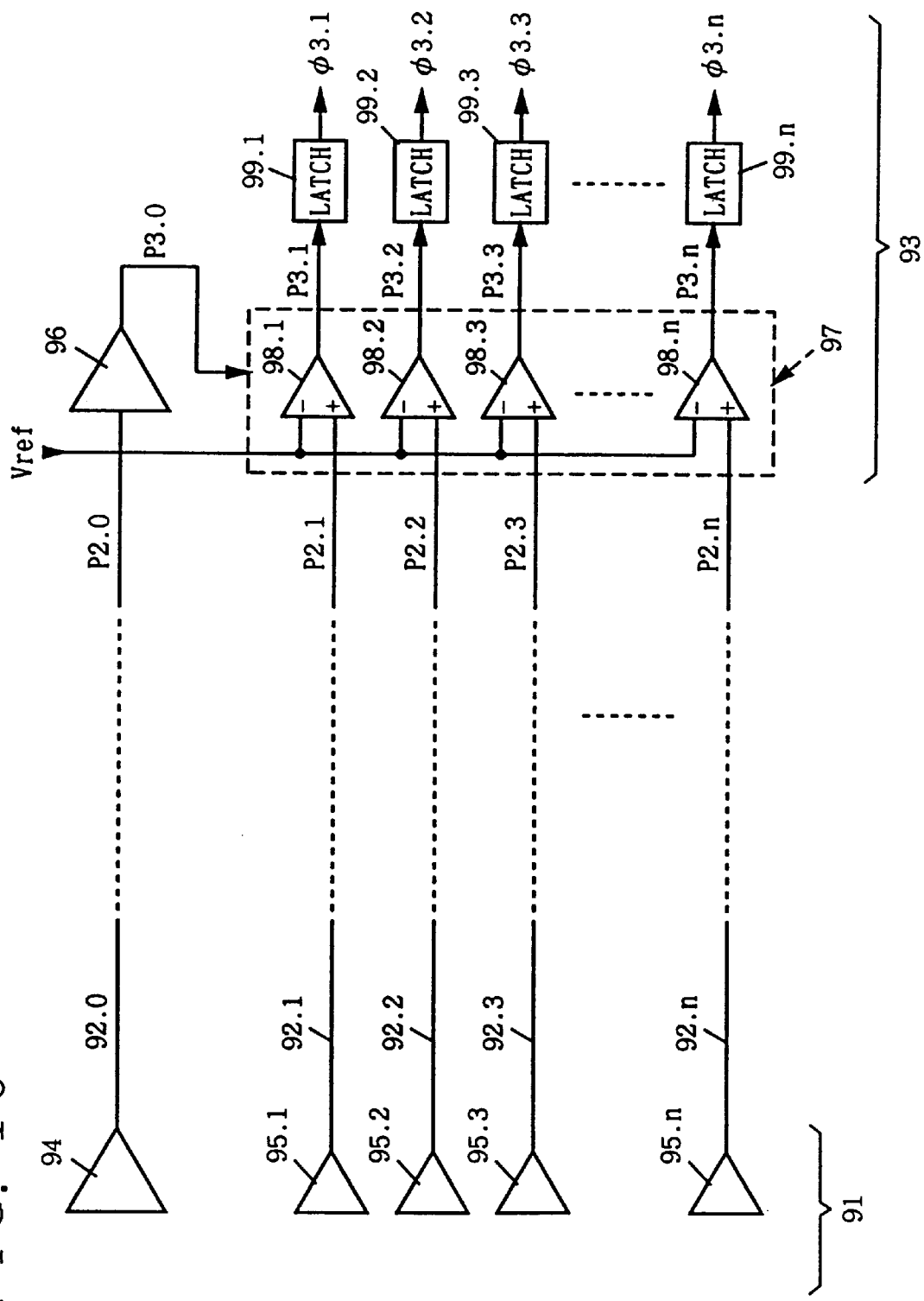
FIG. 16 is a block diagram of a partially omitted circuit showing a detailed configuration of the transmission-detection system in FIG. 15.

Referring to FIG. 16, transmitters 94, 95.1–95.n are provided in semiconductor device 91 of the transmission side corresponding to signal transmission lines 92.0–92.n respectively. Each of transmitters 94, 95.1–95.n has a structure similar to that of transmitter 10 in FIG. 2, and connects each of pulse signals P2.0–P2.n to one end of each signal transmission lines 92.0–92.n. Transmitters 95.1–95.n each operates in synchronization with transmitter 94. When data is "1", for example, each of the transmitters 95.1–95.n outputs each of pulse signals P2.1–P2.n in synchronization with the output of pulse signal P2.0. On the other hand, when data is "0", pulse signals P2.1–P2.n are not output even if pulse signal P2.0 is output.

Receivers 96 and 97 and latch circuits 99.1–99.n are provided in semiconductor device 93 of the reception side. Receiver 96 has a structure similar to that of differential amplifier 20*a* or 20*b* in FIG. 4, and outputs pulse signal P3.0 responsive to pulse signal P2.0. Receiver 97 includes differential amplifiers 98.1–98.n provided respectively corresponding to signal transmission lines 92.1–92.n.

Figure 17:
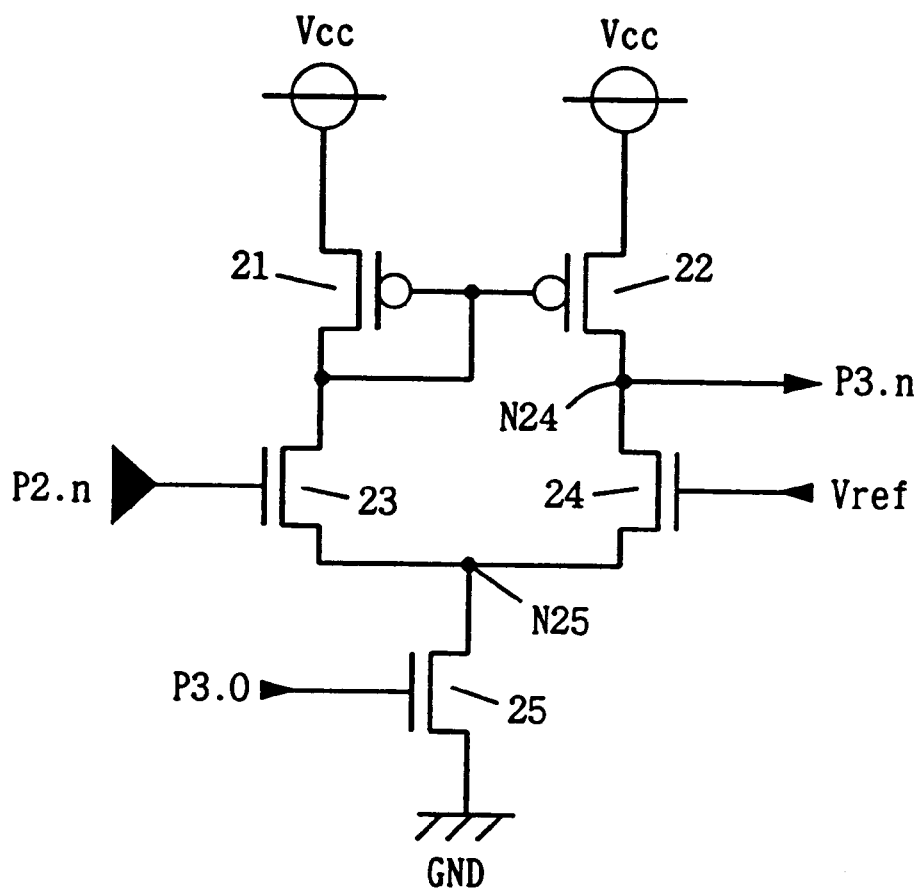
FIG. 17 is a circuit diagram showing a configuration of a differential amplifier in the transmitter in FIG. 16.

Referring to FIG. 17, differential amplifier 98.n has a structure similar to that of differential amplifier 20*a* or 20*b* in FIG. 4. The difference therebetween is that capacitor 25 and resistors 27 and 28 are removed and that pulse signal P3.0 from receiver 96 is supplied to the gate of N channel MOS transistor 25. Accordingly, differential amplifier 98.n carries out the comparing operation only at the time of input of pulse signal P3.0, and outputs pulse signal P3.n responsive to pulse signal P2.n. When there is no input of pulse signal P2.n (data "0"), pulse signal P3.n is not output and differential amplifier 98.n outputs L level. Although differential amplifier 98.n in FIG. 17 is structured similarly to differential amplifier 20*a* in FIG. 4A, it may be structured similarly to differential amplifier 20*b* in FIG. 4B.

Latch circuits 99.1–99.n latch outputs from differential amplifiers 98.1–98.n respectively. Output signals φ3.1–φ3.n from latch circuits 99.1–99.n are supplied to an internal circuit of semiconductor device 93. The internal circuit of semiconductor device 93 reproduces data of n bits by decoding signals φ3.1–φ3.n.

According to this embodiment, an effect similar to that of the first embodiment can be obtained. In addition, more precise transmission and reception of data is possible compared to the first embodiment since detection of the data propagation and determination of data are carried out independently.

Figure 18:
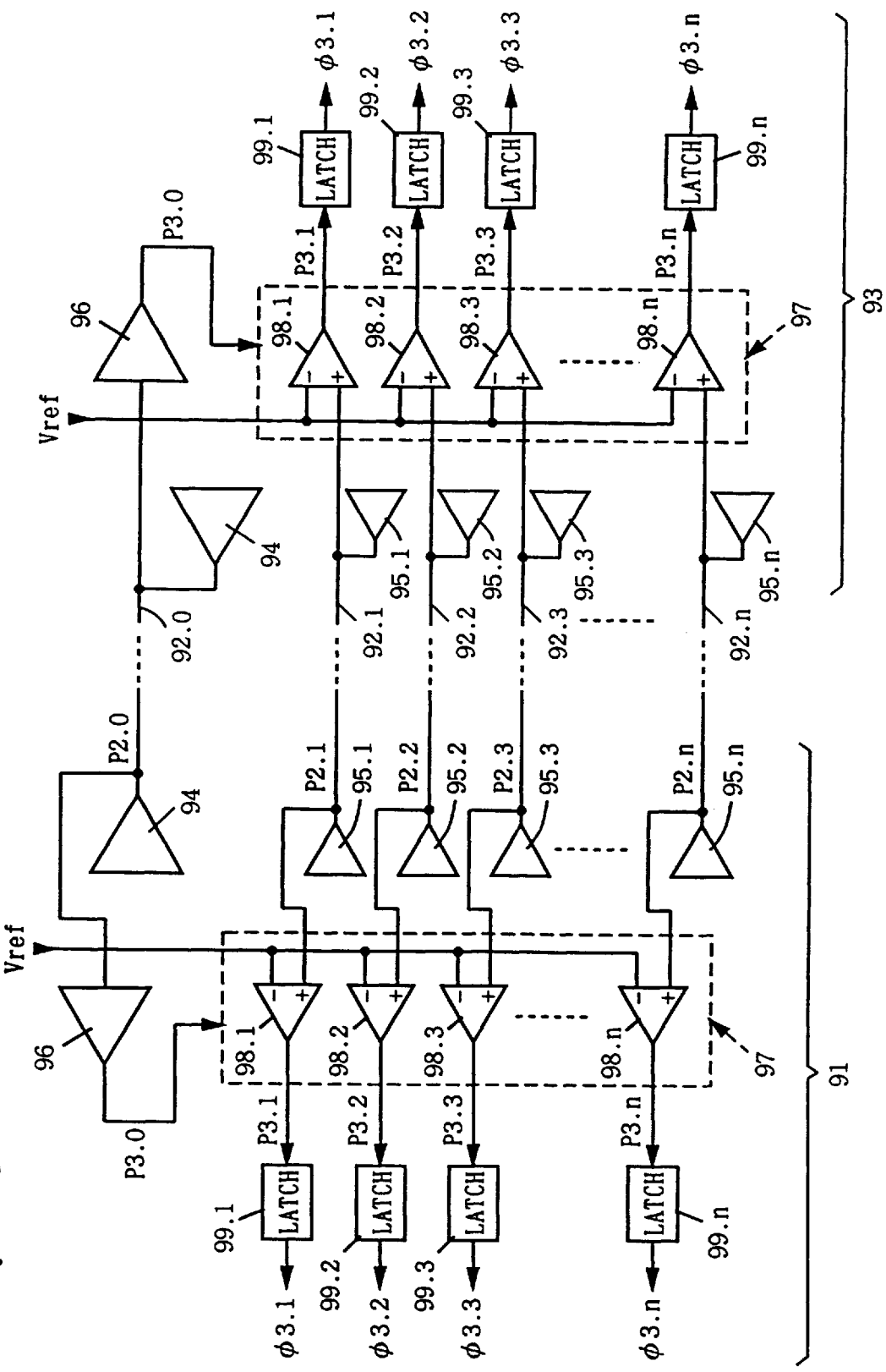
FIG. 18 is a block diagram of a partially omitted circuit illustrating one improved example of the transmission-reception system in FIG. 15.

If transmitters 95.1–95.n, receivers 96 and 97, and latch circuits 99.1–99.n are provided for each of semiconductor devices 91 and 93 as shown in FIG. 18, bidirectional data transmission is possible.

Figure 19:
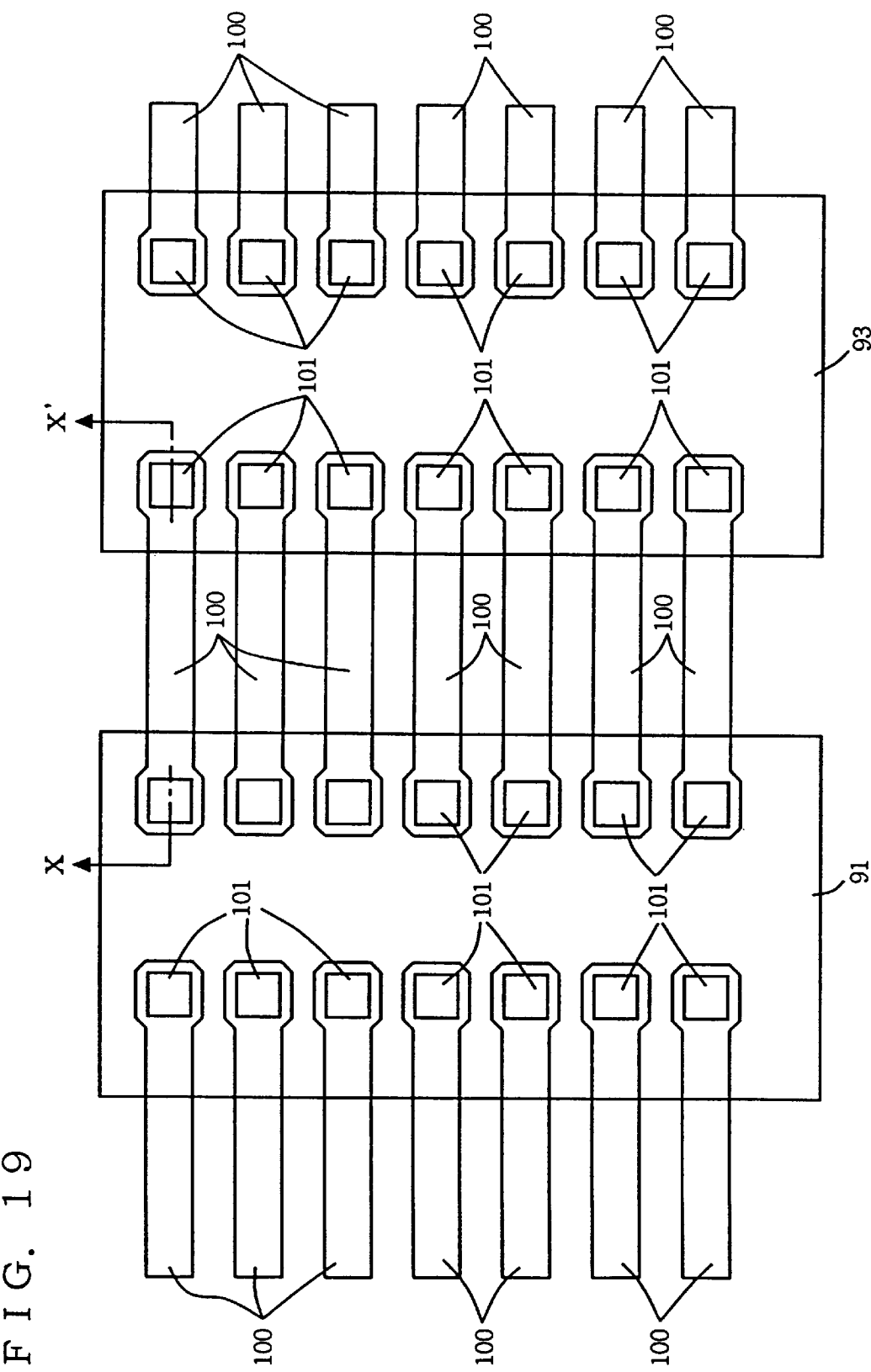
FIG. 19 is a plan view showing the other improved example of the transmission-reception system in FIG. 15.
Figure 20:
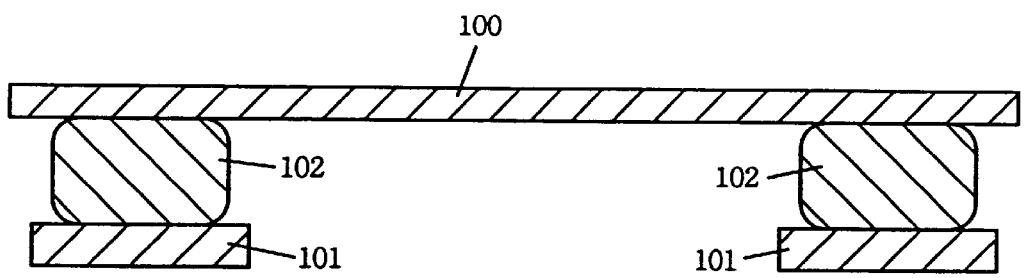
FIG. 20 is a cross section along the line X–X' in FIG. 19.
Figure 21:
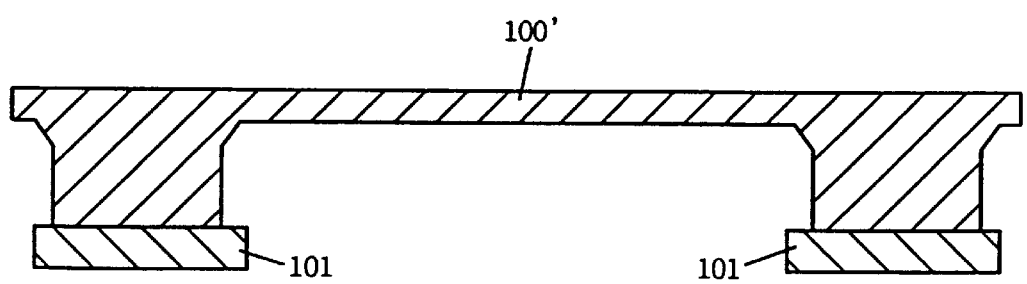
FIG. 21 is a cross sectional view showing still other improved example of the transmission-reception system in FIG. 15.

Referring to FIG. 19, signal transmission lines 92.0–92.n between semiconductor devices 91 and 93 and between semiconductor devices 91 and 93 and the external devices may be formed of metal frame 100. As a result, the parasitic capacitance of signal transmission lines 92.0–92.n can be reduced and equalized so that precise data transmission is possible. As shown in FIG. 20, metal frame 100 of a sheet form may be joined to an aluminum pad 101 (input/output node) of semiconductor devices 91 and 93 via a bump 102. As shown in FIG. 21, a metal frame 100' of a bridge form may be directly joined to aluminum pad 101.

Sixth Embodiment

Figure 22:
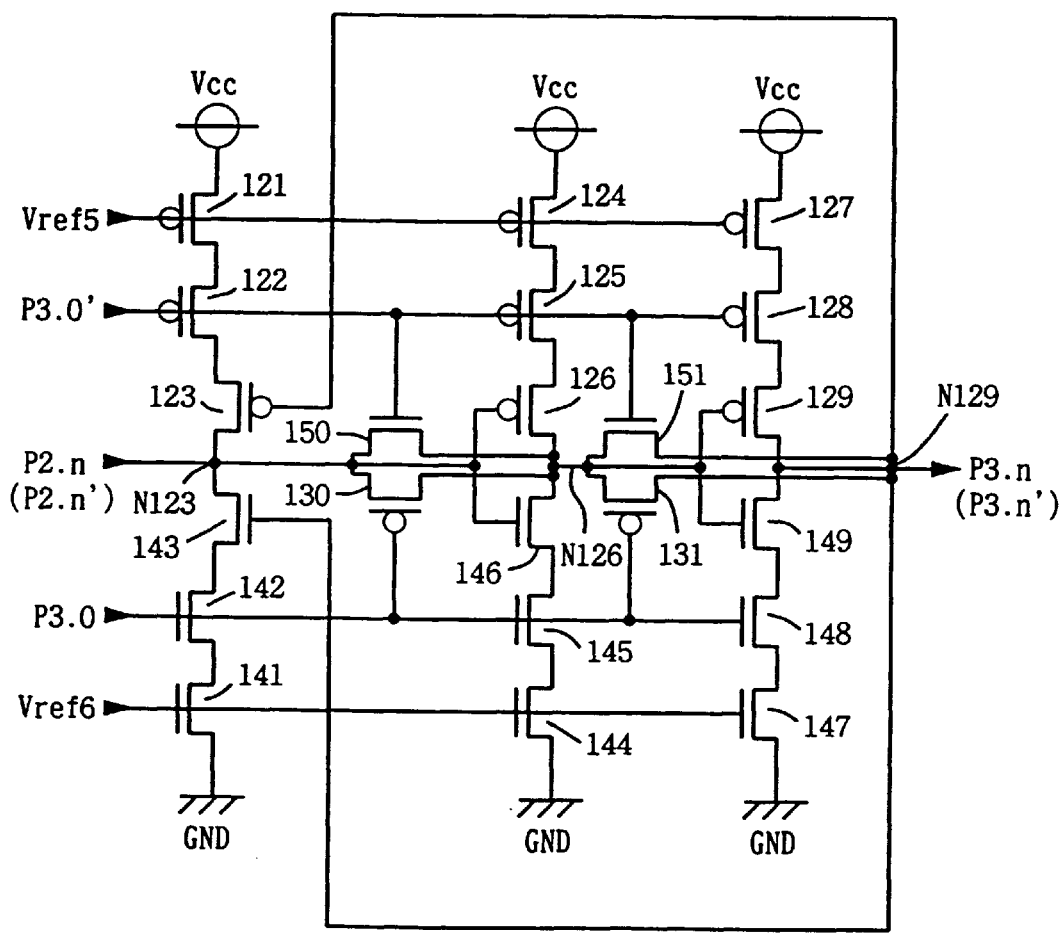
FIG. 22 is a circuit diagram showing a configuration of a receiver in a transmission-reception system according to the sixth embodiment of the invention.

FIG. 22 is a circuit diagram showing a configuration of a receiver 120.n in a transmission-reception system according to the sixth embodiment. The entire configuration of the system is similar to that of the fifth embodiment.

Referring to FIG. 22, receiver 120.n includes P channel MOS transistors 121–131 and N channel MOS transistors 141–151. P channel MOS transistors 121–123, P channel MOS transistors 124–126, and P channel MOS transistors 127–129 are respectively connected in series between lines receiving supply potential Vcc and input node N123, an intermediate node N126, and an output node N129. P channel MOS transistor 130 is connected between nodes N123 and N126, and P channel MOS transistor 131 is connected between nodes N126 and N129.

N channel MOS transistors 141–143, N channel MOS transistors 144–146, and N channel MOS transistors 147–149 are connected in series between lines receiving ground potential GND and input node N123, intermediate node N126, and output node N129, respectively. N channel MOS transistor 150 is connected between nodes N123 and N126, and N channel MOS transistor 151 is connected between nodes N126 and N129.

The gates of P channel MOS transistors 121, 124, and 127 receive reference potential Vref5. Reference potential Vref5 is set such that a predetermined constant current flows through each of P channel MOS transistors 121, 124 and 127. The gates of N channel MOS transistors 141, 144 and 147 receive reference potential Vref6. Reference potential Vref6 is set such that a predetermined constant current flows through each of N channel MOS transistors 141, 144, and 147.

The gates of MOS transistors 122, 125, 128, 150 and 151 receive negative pulse signal P3.0'. Negative pulse signal P3.0' which falls from H level to L level is generated responsive to pulse signal P2.0 in FIG. 16 supplied in synchronization with the data transmission.

The gates of MOS transistors 130, 131, 142, 145 and 148 receive positive pulse signal P3.0. Positive pulse signal P3.0 which rises from L level to H level is generated in synchronization with signal P3.0'.

The gates of MOS transistors 123 and 143, those of MOS transistors 126 and 146, and those of MOS transistors 129 and 149 are respectively connected to output node N129, input node N123, and intermediate node N126.

The description of an operation of receiver 120.n is next given. While pulse signals P3.0' and P3.0 are not supplied, MOS transistors 122, 125, 128, 142, 145, and 148 are turned off and MOS transistors 130, 131, 150, and 151 are turned on. Nodes N123, N126, and N129 is thus turned on, and nodes N123, N126, and N129 are all maintained at reference potential Vref1 (Vcc/2).

Figure 23:
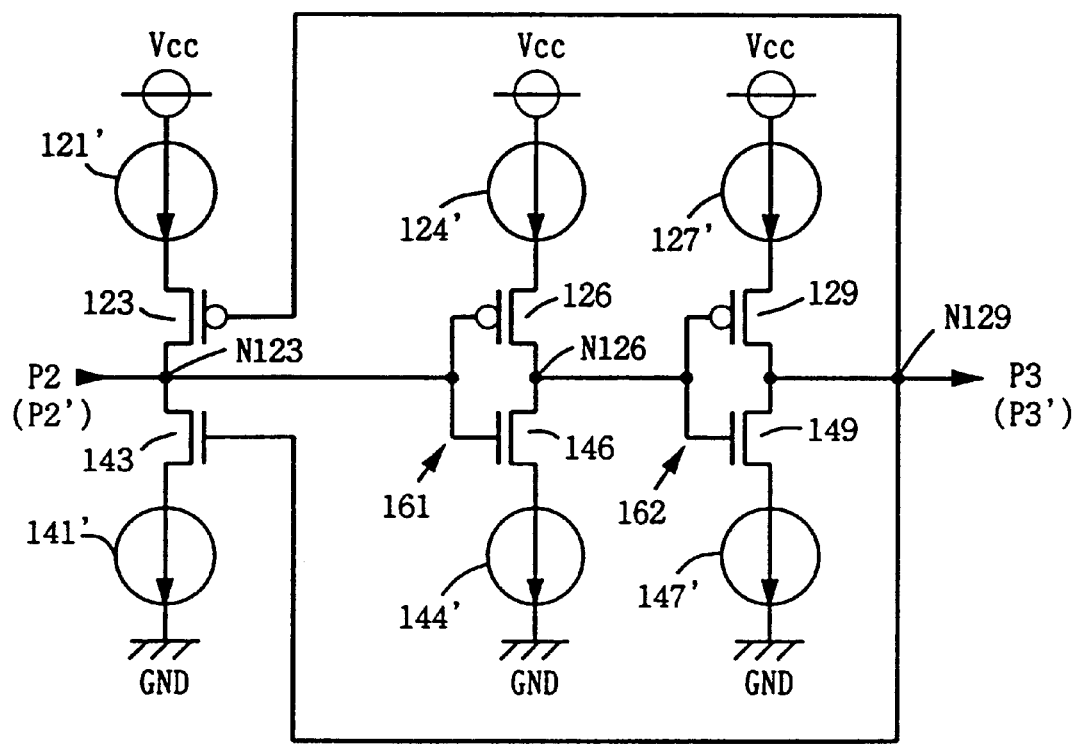
FIG. 23 is a circuit diagram related to an operation of the receiver shown in FIG. 22.

When pulse signals P3.0' and P3.0 are input, MOS transistors 122, 125, 128, 142, 145, and 148 are turned on, and MOS transistors 130, 131, 150, and 151 are turned off, receiver 120.n has a configuration shown in FIG. 23.

Specifically, MOS transistors 121, 124, 127, 141, 144, and 147 constitute constant current sources 121', 124', 127', 141', 144' and 147' respectively, and MOS transistors 126 and MOS transistors 124 and 149 constitute inverters 161 and 162 respectively.

When positive pulse signal P2 is input, positive pulse signal P2 is amplified by inverters 161 and 162, and positive pulse signal P3 is output from output node N129. Responsive to positive pulse signal P3, N channel MOS transistor 143 is turned on and the potential on input node N123 immediately returns to reference potential Vref1.

When negative pulse signal P2' is supplied, negative pulse signal P2' is amplified by inverters 161 and 162, and negative pulse signal P3' is supplied from output node N129. P channel MOS transistor 123 is turned on by negative pulse signal P3', and the potential on input node N123 immediately returns to reference potential Vref1.

According to this embodiment, an effect similar to that of the fifth embodiment can be obtained.

Although the present invention has been described and illustrated in detail, it is clearly understood that the same is by way of illustration and example only and is not to be taken by way of limitation, the spirit and scope of the present invention being limited only by the terms of he appended claims.

What is claimed is:

1. A transmission-reception system for transmitting and receiving data via a signal transmission line, comprising:

charging means connected to said signal transmission line for providing a predetermined initial potential from a voltage supply to the signal transmission line, prior to the transmission of data, with an impedance between the voltage supply and the signal transmission line to charge said signal transmission line to a predetermined first potential;

transmission means including a capacitor having one electrode connected to one end of said signal transmission line, for supplying a second potential which is different from said first potential to the other electrode of said capacitor in a pulsing manner according to said data to output a pulse signal to the one end of said signal transmission line, said transmission means driving the signal transmission line with a power supply which is insulated from the signal transmission line by said capacitor; and reception means connected to the other end of said signal transmission line for receiving the pulse signal output from said transmission means.

2. The transmission-reception system according to claim 1, wherein said charging means includes a first resistor having one electrode receiving said predetermined initial potential and the other electrode connected to said signal transmission line.

3. The transmission-reception system according to claim 2, wherein said transmission means further includes:
   a second resistor having one electrode receiving said predetermined initial potential and the other electrode connected to the other electrode of said capacitor; and
   a connection circuit connected between a line receiving a potential from said power supply and the other electrode of said capacitor, and rendered conductive in a pulsing manner according to said data.

4. The transmission-reception system according to claim 2, wherein said transmission means further includes:

a first connection circuit connected between a line receiving a potential from said power supply and the other electrode of said capacitor and rendered conductive in a pulsing manner according to said data; and
   a second connection circuit connected between a line receiving said predetermined initial potential and the other electrode of said capacitor and rendered conductive when said first connection circuit is rendered non-conductive.

5. The transmission-reception system according to claim 1, wherein said reception means includes comparison means activated by said pulse signal for comparing potential on the other end of said signal transmission line with a third potential which is between said first potential and said second potential, and detecting said pulse signal based on the result of the comparison.

6. The transmission-reception system according to claim 1, wherein said reception means further includes:
   a constant current source activated by said pulse signal for supplying a predetermined current;
   a resistor where current supplied from said constant current source flows through; and
   comparison means for comparing potential on one electrode with potential on the other electrode of said resistor and detecting said pulse signal based on the result of the comparison.

7. The transmission-reception system according to claim 1, wherein said power supply supplies a power supply potential.

8. The transmission-reception system according to claim 1, wherein said power supply supplies a ground potential.

9. A transmission-reception system for transmitting and receiving data via first and second signal transmission lines, comprising:

charging means connected to said first and second signal transmission lines for providing a predetermined initial potential from a voltage supply to the first and second signal transmission lines, prior to the transmission of data, with an impedance between the voltage supply and the first and second signal transmission lines to charge said first and second signal transmission lines to a predetermined first potential;

transmission means including first and second capacitors having one electrodes respectively connected to said first and second signal transmission lines, for supplying a second potential higher than said first potential and a third potential lower than said first potential to the other electrodes of said first and second capacitors respectively according to said data to output first and second pulse signals complementary to each other to one ends of said first and second signal transmission lines respectively, said transmission means driving the first signal transmission line with a first power supply which is insulated from the first signal transmission line by said first capacitor, and driving the second signal transmission line with a second power supply which is insulated from the second signal transmission line by said second capacitor; and reception means connected to the other ends of said first and second signal transmission lines for receiving said first and second pulse signals output from said transmission means.

10. The transmission-reception system according to claim 9, wherein said reception means includes comparison means activated by at least one of said first and second pulse signals for comparing potential on the other end of said first signal transmission line with potential on the other end of said second signal transmission line and detecting said first and second pulse signals based on the result of the comparison.

11. A transmission-reception system for transmitting and receiving data via first and second signal transmission lines, comprising:

first charging means connected to said first signal transmission line for charging said first signal transmission line to a predetermined first potential;

second charging means connected to said second signal transmission line for charging said second signal transmission line to a predetermined second potential;

first transmission means including a first capacitor having one electrode connected to one end of said first signal transmission line, for supplying a third potential different from said first potential to the other electrode of said first capacitor in a pulsing manner according to said data to output a first pulse signal to one end of said first signal transmission line;

second transmission means including a second capacitor having one electrode connected to one end of said second signal transmission line, for supplying a fourth potential different from said second potential to the other electrode of said second capacitor in synchronization with said first transmission means to output a second pulse signal for notifying the output of said first pulse signal to one end of said second signal transmission line; and reception means connected to the other ends of said first and second signal transmission lines and activated by said second pulse signal output from said second transmission means for receiving said first pulse signal output from said first transmission means.

12. The transmission-reception system according to claim 11, wherein said reception means includes:

amplify means activated by said second pulse signal for amplifying said first pulse signal; and third charging means activated by said second pulse signal and responsive to an output from said amplify means for returning potential on said first signal transmission line to said first potential.

* * * * *